United States Patent
Ono et al.

(10) Patent No.: US 7,966,127 B2
(45) Date of Patent: Jun. 21, 2011

(54) VEHICLE MOTION CONTROL DEVICE

(75) Inventors: Eiichi Ono, Toyota (JP); Yoshiki Ninomiya, Nagoya (JP); Yoshikatsu Kisanuki, Seto (JP); Takero Hongo, Seto (JP); Kiyokazu Sunami, Tajimi (JP); Yuichi Tanaka, Seto (JP); Kazunori Furukawa, Ichinomiya (JP); Yoshikazu Hattori, Nisshin (JP); Yuji Muragishi, Owariasahi (JP); Arata Takahashi, Nagoya (JP); Yojiro Koike, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 1027 days.

(21) Appl. No.: 11/813,037

(22) PCT Filed: Dec. 28, 2005

(86) PCT No.: PCT/JP2005/024061
§ 371 (c)(1),
(2), (4) Date: Jun. 28, 2007

(87) PCT Pub. No.: WO2006/070865
PCT Pub. Date: Jul. 6, 2006

(65) Prior Publication Data
US 2008/0097699 A1    Apr. 24, 2008

(30) Foreign Application Priority Data

Dec. 28, 2004    (JP) ................................ 2004-382123

(51) Int. Cl.
*G06F 17/10* (2006.01)

(52) U.S. Cl. ........................................ 701/300; 301/96

(58) Field of Classification Search .......... 701/300–302, 701/96, 23; 340/435–436; 180/167
See application file for complete search history.

(56) References Cited

U.S. PATENT DOCUMENTS

| 2004/0246114 | A1 | 12/2004 | Hahn |
| 2007/0288133 | A1* | 12/2007 | Nishira et al. ................. 701/23 |

FOREIGN PATENT DOCUMENTS

| DE | 197 41 631 A1 | 3/1999 |
| DE | 100 36 276 A1 | 2/2002 |
| DE | 102 31 556 A1 | 1/2003 |
| DE | 103 01 290 A1 | 8/2003 |
| DE | 10 2004 014 540 A1 | 11/2004 |
| DE | 103 25 762 A1 | 12/2004 |
| JP | 5 113822 | 5/1993 |

(Continued)

*Primary Examiner* — Yonel Beaulieu
(74) *Attorney, Agent, or Firm* — Oblon, Spivak, McClelland, Maier & Neustadt, L.L.P.

(57) ABSTRACT

The invention provides a vehicle motion control device capable of realizing optimum avoidance control in the case of an emergency. The vehicle motion control device includes an external environment detection unit for detecting external environment, and a travel state detection unit for detecting a travel state of a driver's vehicle. An obstruction is detected based on the external environment detected by the external environment detection unit, and an environment map indicating obstructions is created. A control device estimates a plurality of possible avoidance actions for avoiding an obstruction based on the environment map and the travel state of the driver's vehicle detected by the travel state detection unit. The control device estimates collision damage according to each avoidance action estimated by the avoidance action estimation unit, and selects an appropriate avoidance action based on the estimated collision damage. The control device controls a vehicle such that the selected avoidance action is carried out.

19 Claims, 30 Drawing Sheets

FOREIGN PATENT DOCUMENTS

| | | |
|---|---|---|
| JP | 6 40289 | 2/1994 |
| JP | 10 258722 | 9/1998 |
| JP | 11 348799 | 12/1999 |
| JP | 2000 95130 | 4/2000 |
| JP | 3183594 | 4/2001 |
| JP | 2003 63430 | 3/2003 |
| JP | 2003 81039 | 3/2003 |
| JP | 3451321 | 7/2003 |
| JP | 2003 327018 | 11/2003 |
| JP | 2004 249971 | 9/2004 |
| JP | 2004 268829 | 9/2004 |
| JP | 2004 362586 | 12/2004 |

* cited by examiner

F I G. 1 2
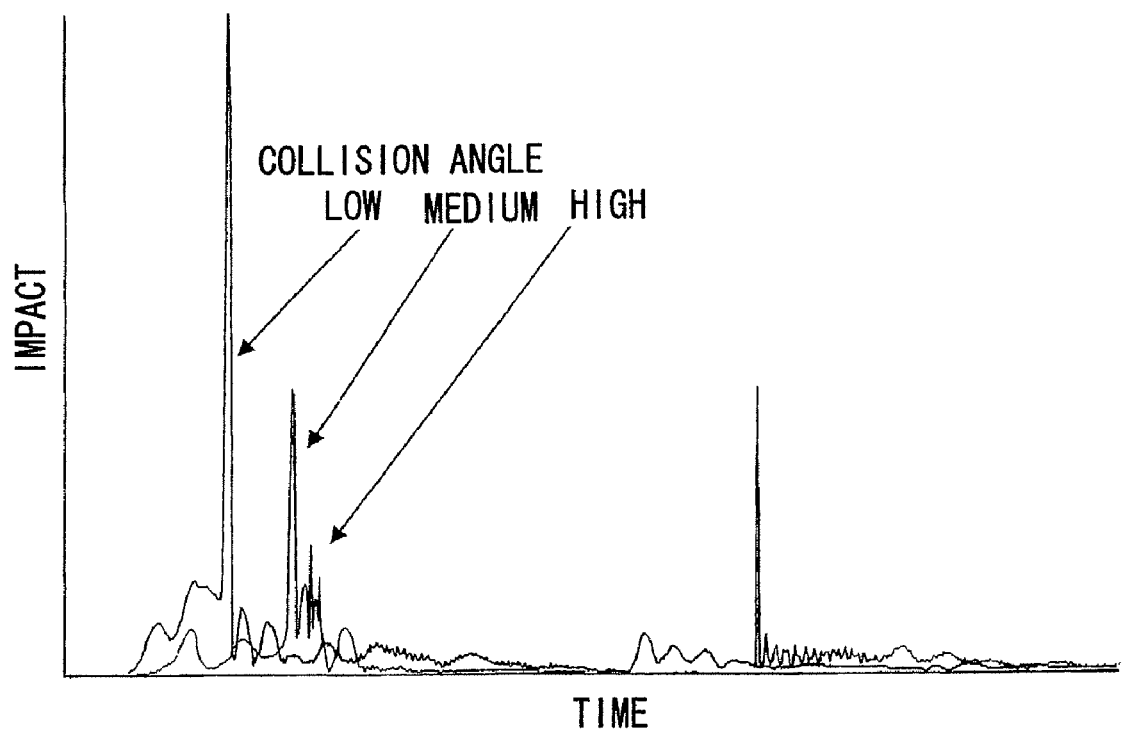

FUTURE RISK MAP

SHORTEST AVOIDANCE TRAJECTORY

TTC RISK MAP AND OPTIMUM TRAJECTORY

TTC RISK MAP OF VEHICLE A AND OPTIMUM TRAJECTORY

TTC RISK MAP OF VEHICLE B AND OPTIMUM TRAJECTORY

F I G. 2 5
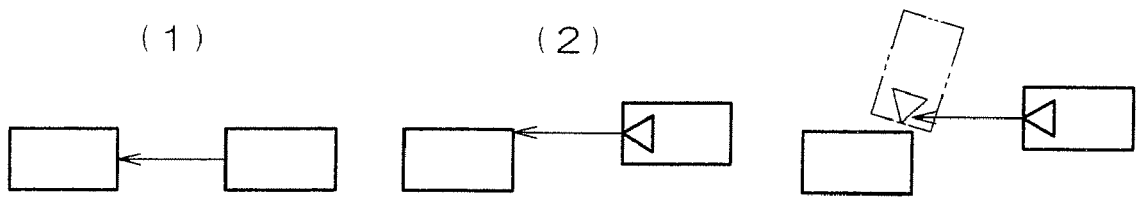

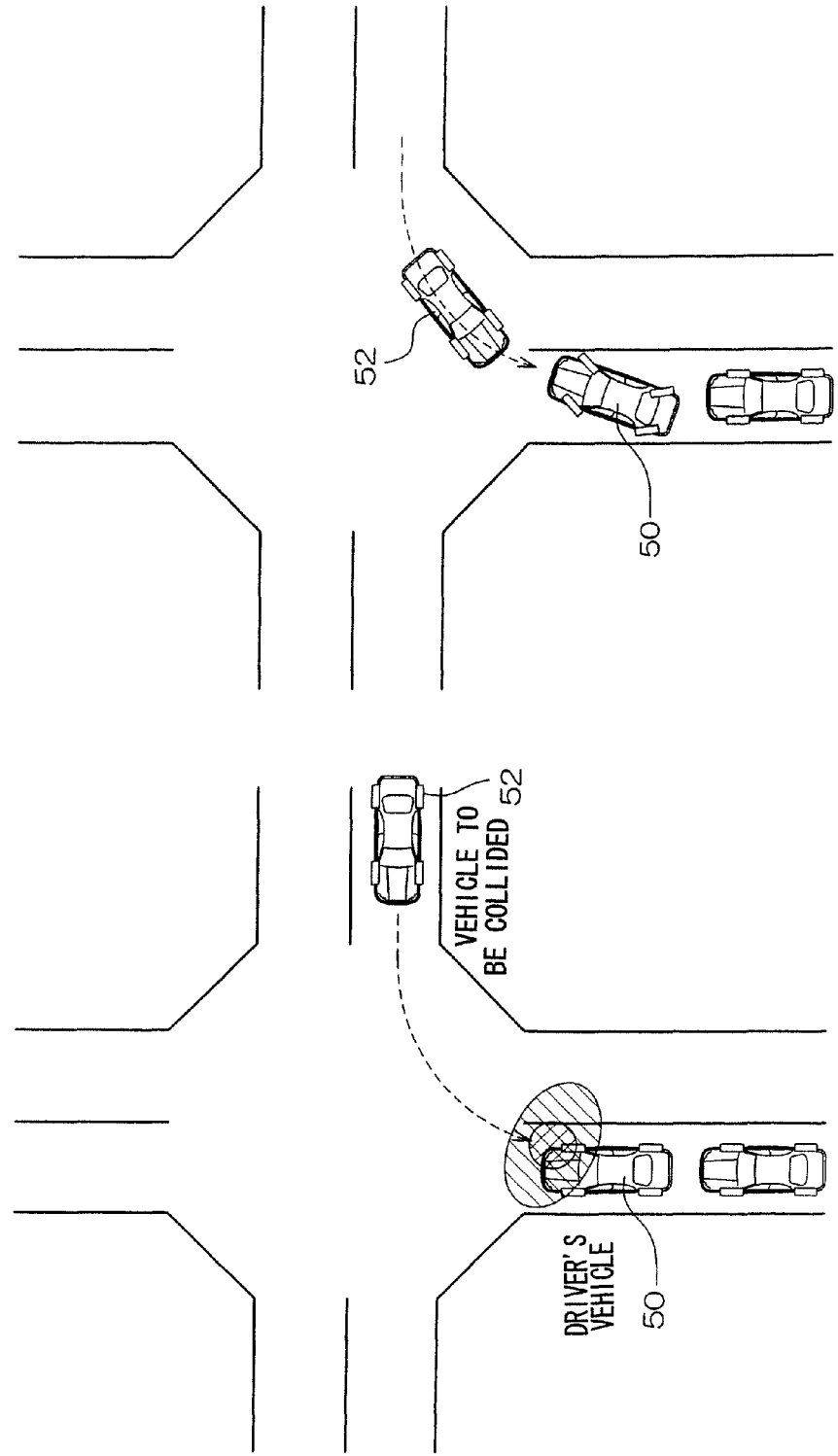

F I G. 2 8
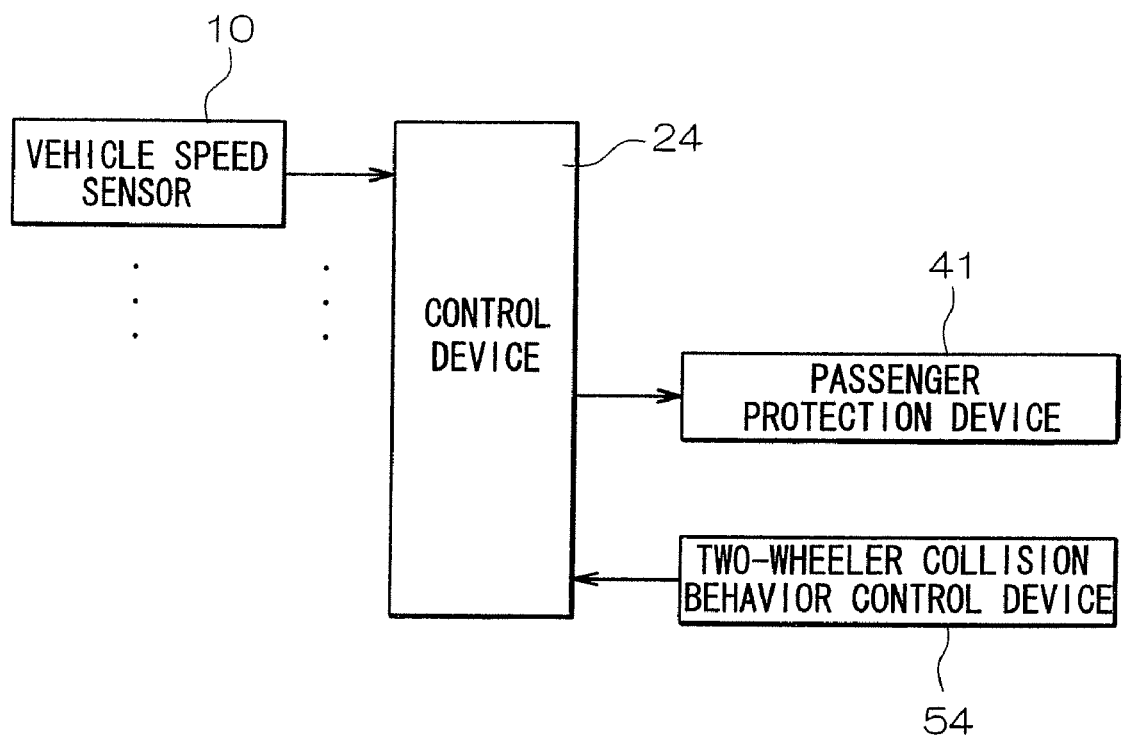

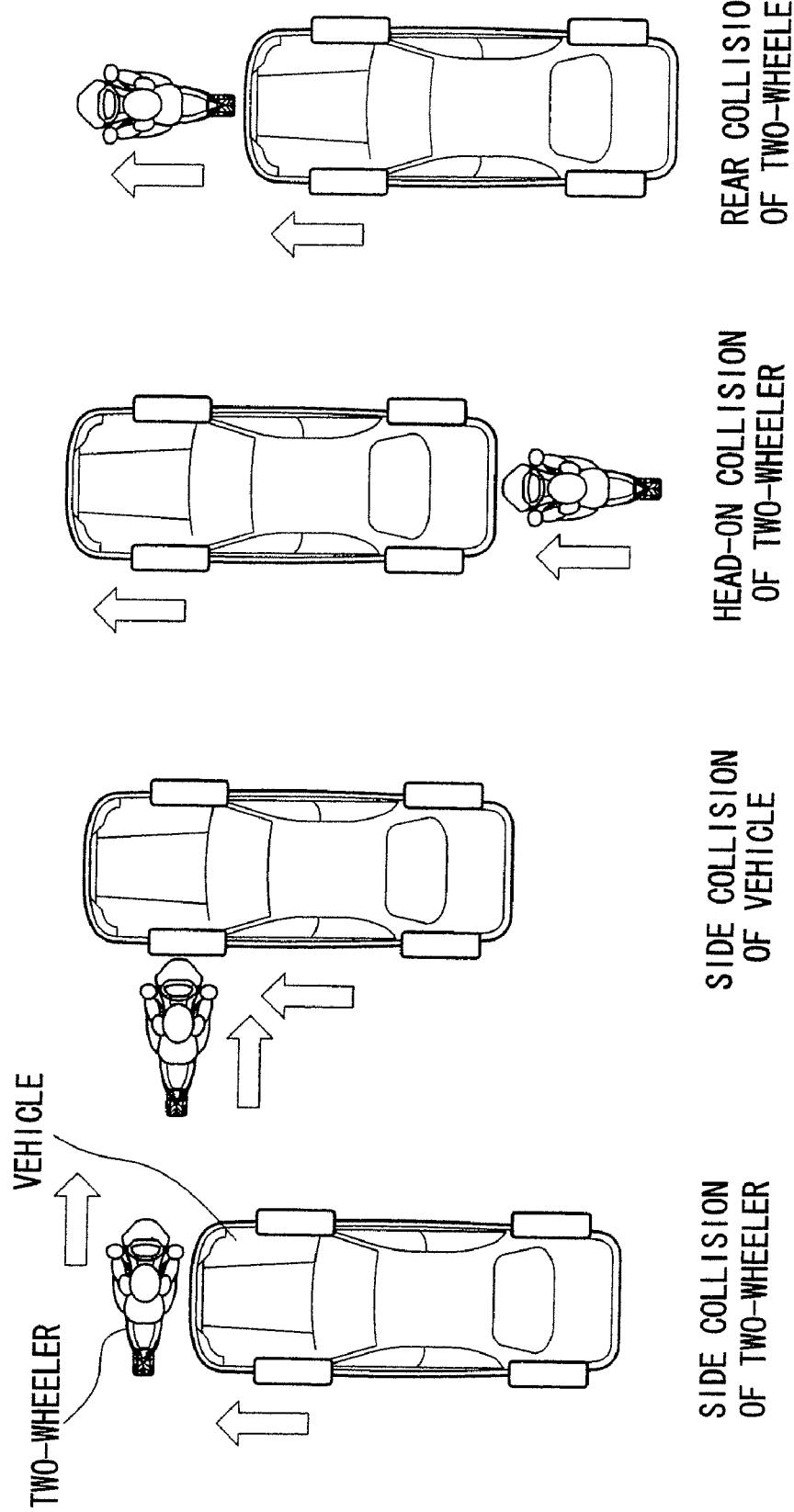

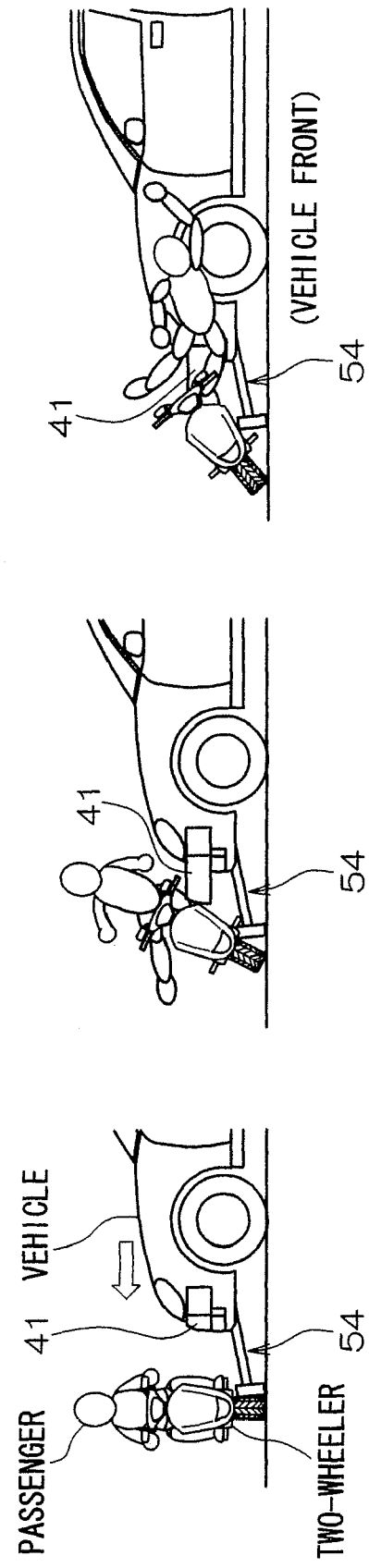

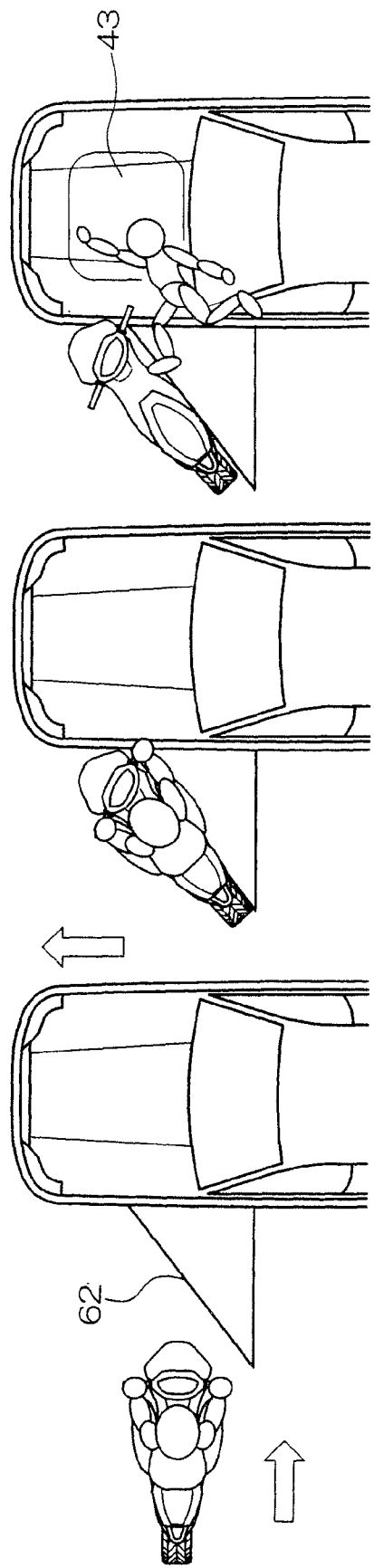

VEHICLE MOTION CONTROL DEVICE

TECHNICAL FIELD

The present invention relates to a vehicle motion control device, and particularly, to a vehicle motion control device which detects an obstruction and controls the motion of a vehicle so as to avoid the detected obstruction, or detects an obstruction and effects control such that damage is minimized when it is difficult to avoid the detected obstruction.

BACKGROUND ART

Conventionally, a vehicle driving operation assisting device which assists a driving operation of a driver in a longitudinal direction and a lateral direction is known. This vehicle driving operation assisting device detects an obstruction with respect to a driver's vehicle, calculates a degree of risk of the driver's vehicle with respect to the obstruction, and controls the operation of the vehicle equipment in order to encourage the driver to drive in the lateral direction and the longitudinal direction based on the degree of risk (Japanese Patent Application Laid-open (JP-A) No. 2003-327018).

Further, a target composite force applied to a vehicle body is calculated, a size of a critical friction circle of each wheel is estimated, a critical composite force is estimated based on the size of the estimated critical friction circle, a ratio between the target composite force and the critical composite force is set as a μ-utilization ratio, the magnitude of a tire generating force is set based on the size of the critical friction circle and the μ-utilization ratio, the direction of the tire generating force generated in each wheel to be controlled is set, and the steering operation, the braking operation and the driving operation are controlled in coordination based on the magnitude of the set tire generating force and the set direction of the tire generating force (JP-A No. 2004-249971).

DISCLOSURE OF THE INVENTION

Problems to be Solved by the Invention

According to the technique of JP-A No. 2003-327018, however, since the degree of risk at the position of the driver's vehicle (in the longitudinal direction and the lateral direction) is calculated based on the relative position and relative speed with respect to an obstruction at the current time, variations in the degree of risk caused by estimation of movement of the obstruction and the avoidance control are not taken into account, and therefore the estimation precision of the degree of risk is lowered. Further, control of the steering operation and control of the braking operation and driving operation are carried out independently from each other, and non-linear characteristics of the tire generating force (relation of friction circle) are not taken into account and, therefore, appropriate control cannot be carried out in the critical region that is important to avoidance control.

In JP-A No. 2004-249971, it is proposed to control the steering operation and the braking operation and the driving operation in coordination, but it is difficult to control the vehicle motion so as to avoid a detected obstruction and to effect control such that damage is minimized when it is difficult to avoid the detected obstruction.

That is, according to the conventional techniques, although there is a certain effect of lowering the degree of risk, there is a problem that optimum control for avoiding an obstruction cannot be carried out in the case of an emergency.

The invention has been accomplished to solve this problem, and it is an object of the invention to provide a vehicle motion control device capable of realizing optimum control for avoiding an obstruction in the case of an emergency.

Means for Solving Problem

To achieve the above object, the invention provides a vehicle motion control device comprising an external environment detection unit for detecting an external environment, a travel state detection unit for detecting a travel state of a driver's vehicle, an environment map creation unit for detecting an obstruction based on the external environment detected by the external environment detection unit and for creating an environment map indicating the obstruction, an avoidance action estimation unit for estimating a plurality of possible avoidance actions for avoiding the obstruction based on the environment map and the travel state of the driver's vehicle detected by the travel state detection unit, and selection unit for estimating collision damage according to each avoidance action estimated by the avoidance action estimation unit and for selecting an appropriate avoidance action based on the estimated collision damages.

According to the invention, since the optimum avoidance action is selected based on the estimated collision damage, the optimum avoidance action based on the estimated collision damage, the collision damage (e.g., human damage and physical damage), for example, can be minimized.

According to the invention, when an avoidance action exist according to which the collision damage is less than a predetermined value, e.g., there is no collision damage or there exists an avoidance action according to which the collision damage is very small, the selection unit selects the avoidance action according to the collision damage is less than the predetermined value as the appropriate avoidance action, and when there is no avoidance action according to which the collision damage is less than the predetermined value, the selection unit selects an avoidance action having the minimum collision damage equal to or higher than the predetermined value as the appropriate avoidance action.

Further, when the possibility of a new obstruction appearing from a dead angle region in the environment map is low, and when the possibility of a new obstruction appearing from the dead angle region in the environment map and interfering with the avoidance action estimated by the avoidance action estimation unit is low, the selection unit selects an appropriate avoidance action based on the estimated collision damage, and when the possibility of a new obstruction appearing from the dead angle region in the environment map and interfering with the avoidance action estimated by the avoidance action estimation unit is high, the selection unit selects, as the optimum avoidance action, a straight braking avoidance action of traveling at maximum deceleration in parallel to the road on which the driver's vehicle is traveling, or an avoidance action to be carried out by the driver.

Since it is presumed that in some cases the external environment cannot be detected by the external environment detection unit, a dead angle region may be generated in the environment map. Therefore, when the possibility of a new obstruction appearing from the dead angle region in the environment map and interfering with an avoidance action estimated by the avoidance action estimation unit is high, the estimated avoidance action is not selected, and the straight braking avoidance action of traveling at maximum deceleration in parallel to the road on which the driver's vehicle is traveling or the avoidance action to be carried out by the driver is selected as the optimum avoidance action. Thereby, it is possible to handle a situation in which the dead angle region is generated in the environment map.

Further, the invention provides a vehicle motion control device comprising an external environment detection unit for detecting an external environment, a risk map creation unit for detecting a position and a type of an obstruction based on the external environment detected by the external environment detection unit and for creating a risk map to predict a current degree of risk based on the position and the type of the obstruction, an action prediction database in which data, including data indicating a probability of the presence of an obstruction, for predicting behavior of an obstruction is stored, a future risk map creation unit for creating a future risk map to predict a degree of risk after a predetermined time based on the current risk map created by the risk map creation unit and the action prediction database, a passage time risk prediction unit for creating a passage time risk map to show a risk at a passage time when the driver's vehicle passes at the time of a shortest avoidance control based on a passage time through a shortest trajectory when a shortest avoidance control for moving to a lateral position on the road is executed, having the lateral position on the road as a parameter, and on the future risk map, and control unit for determining, as the avoidance action, an action for moving to a lateral position on a road that minimizes the risk on the shortest trajectory based on the passage time risk map and for controlling the driver's vehicle such that the determined avoidance action is carried out. Concerning execution of the determined avoidance action, the determined action can be carried out when the risk of the determined avoidance action exceeds a predetermined value and becomes dangerous. Even if the risk of the estimated avoidance action does not exceed the predetermined value, the estimated avoidance action can be carried out when a driver carries out a steering operation to avoid the obstruction. When the degree of risk of the determined avoidance action does not exceed the predetermined value, the estimated avoidance action may be carried out using the steering operation of a driver as a trigger.

Time B, which precedes a time when the driver carries out the steering operation by a predetermined time A, is defined as a reference, and based on a record of the direction in which the driver's face faces during a predetermined time C as counted from the time B, it is determined whether the driver was able adequately monitor in a forward direction based on the direction of the driver's face and, as a result of the determination, if it is determined that the driver could not adequately monitor in a forward direction, the steering operation action of the driver may not be employed as a starting trigger of the determined avoidance action. That is, the steering operation of a driver who could not monitor forward sufficiently is not employed as a trigger.

For example, when time A is 1.8 seconds, and time C is 1 second, it is assumed that the lag time between the driver determining the steering operation until the subsequent steering operation action is a remainder of 0.3 seconds.

Further, when the possibility of a new obstruction appearing from a dead angle region of the passage time risk map is low, and when the possibility of a new obstruction appearing from the dead angle region in the passage time risk map and interfering with the determined avoidance action is low, the control unit controls the driver's vehicle such that the determined avoidance action is carried out, and when the possibility of the new obstruction appearing from the dead angle region in the passage time risk map and interfering with the determined avoidance action is high, the control unit controls the driver's vehicle such that a straight braking avoidance action of traveling at maximum deceleration in parallel to the road on which the driver's vehicle is traveling, or an avoidance action to be carried out by the driver, is carried out.

When the possibility of the new obstruction appearing from the dead angle region in the passage time risk map and interfering with the avoidance action is high, the control unit controls the driver's vehicle such that a straight braking avoidance action of traveling at maximum deceleration in parallel to the road on which the driver's vehicle is traveling, or an avoidance action to be carried out by the driver, is carried out. Therefore, it is possible to handle a situation in which the dead angle region is generated in the passage time risk map.

When the obstruction is a pedestrian, at least one of age and the direction of line of sight is checked, and the probability of the presence of the obstruction after a predetermined time is corrected based on a result of the check. Thereby, the expectation precision can be improved.

The shortest trajectory of the invention is obtained in accordance with a longitudinal speed of the driver's vehicle with respect to the road, the lateral speed of the driver's vehicle, the friction coefficient between a tire of the driver's vehicle and the road surface, and the distance between a target lateral position and the lateral position of the driver's vehicle. The risk is determined by the product of a standard degree of risk corresponding to the type of the obstruction and a correction coefficient determined based on at least one of the external environment or an accident occurrence ratio.

EFFECT OF THE INVENTION

According to the invention, as explained above, there is an effect that it is possible to optimally control for avoiding an obstruction in the case of an emergency.

BRIEF DESCRIPTION OF THE DRAWINGS

FIG. 12 is a diagram showing a investigation of research of influence of an impact force on a head at the time when a mounting angle of the pedestrian controller is changed;

FIGS. 25(1), (2) and (3) are explanatory diagrams showing magnitude of damage caused by difference in collision portions;

FIG. 27 is an explanatory diagram of impact alleviating yaw angle control when a vehicle stops at an intersection;

FIG. 28 is a block diagram showing an example of a vehicle motion control device comprising a two-wheeler impact behavior control device and a two-wheeler passenger protection device of the example;

FIG. 29A is a schematic diagram used for explaining the form of collision between a two-wheeler and a vehicle;

FIG. 29B is a schematic diagram used for explaining the form of collision between a two-wheeler and a vehicle;

FIG. 29C is a schematic diagram used for explaining the form of collision between a two-wheeler and a vehicle;

FIG. 29D is a schematic diagram used for explaining the form of collision between a two-wheeler and a vehicle;

FIG. 30 is a schematic diagram showing a simulation result of side collision of the two-wheeler;

FIG. 33A is a schematic diagram used for explaining the two-wheeler collision behavior and the passenger collision behavior at the time of side collision of a vehicle;

FIG. 33B is a schematic diagram used for explaining the two-wheeler collision behavior and the passenger collision behavior at the time of side collision of a vehicle;

FIG. 33C is a schematic diagram used for explaining the two-wheeler collision behavior and the passenger collision behavior at the time of side collision of a vehicle;

BEST MODE FOR CARRYING OUT THE INVENTION

Examples of the invention will be explained in detail with reference to the drawings below.

Figure 1:
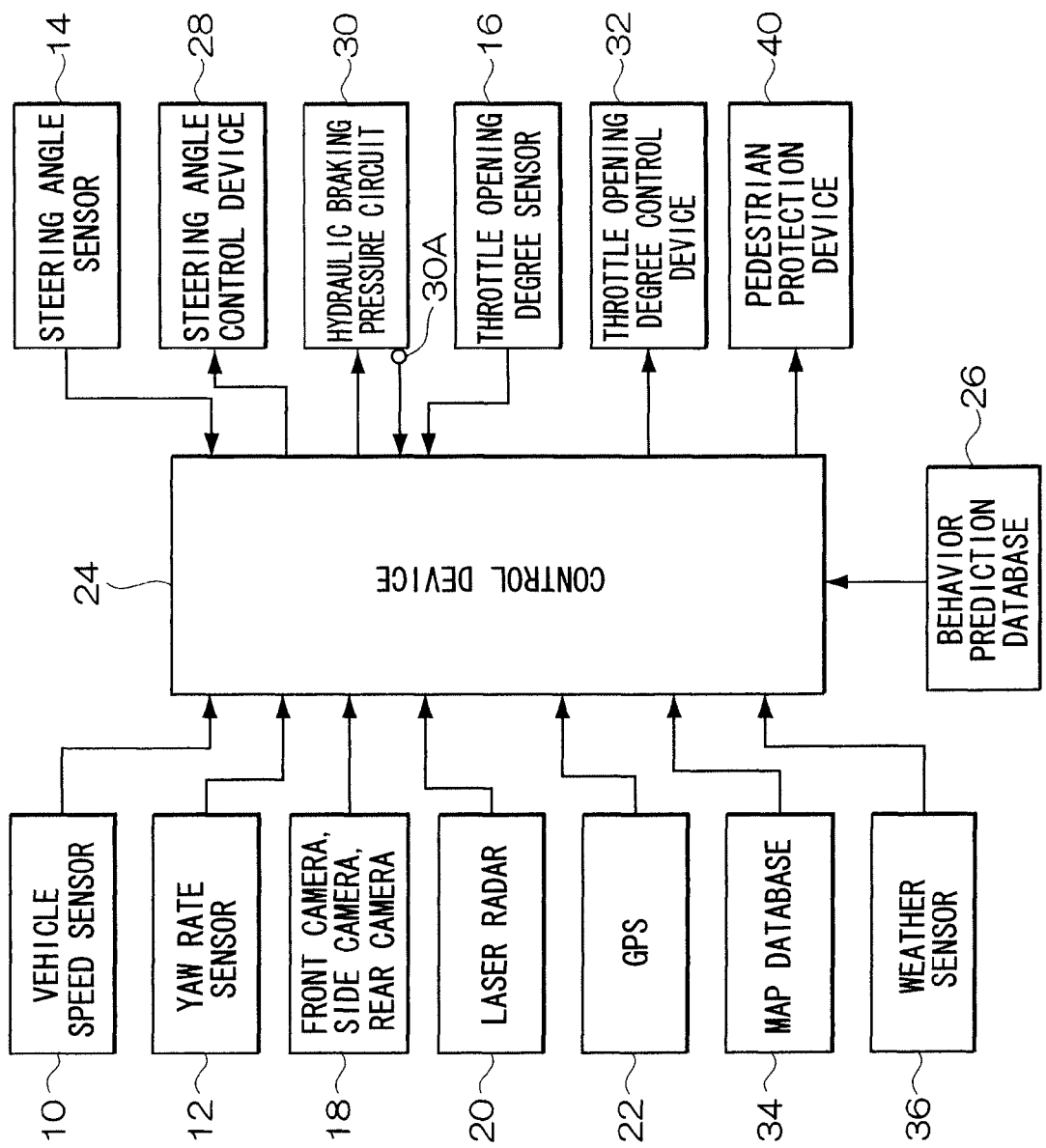
FIG. 1 is a block diagram showing a vehicle motion control device of an example (first example)

As shown in FIG. 1, a vehicle motion control device of an example includes a group of sensors provided on a vehicle as travel state detection means for detecting a travel state of a driver's vehicle, a group of sensors provided on the vehicle as external environment detection means for detecting an external environment state, and a control device which carries out avoidance action for avoiding an obstruction and carries out damage minimization action when it is difficult to avoid the obstruction by controlling vehicle-mounted devices mounted in the driver's vehicle so as to control action of the driver's vehicle based on detection data from the groups of sensors.

As the group of sensors of the vehicle motion control divide for detecting the travel state of the driver's vehicle, there are provided a vehicle speed sensor 10 for detecting a vehicle speed, a yaw rate sensor 12 for detecting a yaw rate, a steering angle sensor 14 for detecting a steering angle, and a throttle opening degree sensor 16 for detecting an opening degree of a throttle valve.

As the group of sensors of the vehicle motion control device for detecting the external environment state, there are provided a camera 18 for shooting the front, side and rear of the driver's vehicle, a laser radar 20 for detecting an obstruction in front of the driver's vehicle, a GPS 22 for detecting a position of the driver's vehicle, and a weather sensor 36 comprising a barometer sensor, a temperature sensor and a humidity sensor. A millimeter wave radar may be provided instead of the laser radar or together with the laser radar. In addition to the laser radar for detecting the vehicle front, a laser radar for detecting the vehicle side and the vehicle rear may also be provided.

The camera 18 comprises a front camera mounted in the upper portion, or the like, of the front window of the vehicle for shooting the front of the vehicle, a pair of rear cameras mounted on left and right ends of a rear window, or the like, for shooting the rear of the vehicle, and side cameras mounted on door mirrors for shooting the side of the vehicle. The front, side and rear cameras are compact CCD cameras or CMOS cameras, they shoot regions including road states of the front, rear and side of the driver's vehicle, and output the obtained image data by shooting. The output image data is input to a control device 24 comprising a microcomputer. In addition to the front camera, side cameras and rear cameras, it is preferable to further use a front infrared camera, or front and rear infrared cameras, or front, side and rear infrared cameras. If the infrared camera is used, a pedestrian can reliably be detected. A near-infrared camera can be used instead of the infrared camera. In this case also, a pedestrian can reliably be detected.

The laser radar 20 includes a light-emitting device comprising a semiconductor laser which emits infrared optical pulse and scans in the horizontal direction, and a light receiving element which receives infrared optical pulse reflected from the obstruction (pedestrian or front vehicle) in front. The laser radar 20 is mounted on a front grill or bumper of the vehicle. The laser radar 20 can detects a distance from the driver's vehicle to a obstruction in front and the direction of presence of the obstruction based on the time period of reaching of the reflected infrared pulse from the point of time at which it is issued from the light emitting device until it is received by the light receiving element. Data showing the distance to the obstruction detected by the laser radar 20 and data showing the direction of presence of the obstruction are input to the control device 24.

Figure 2:
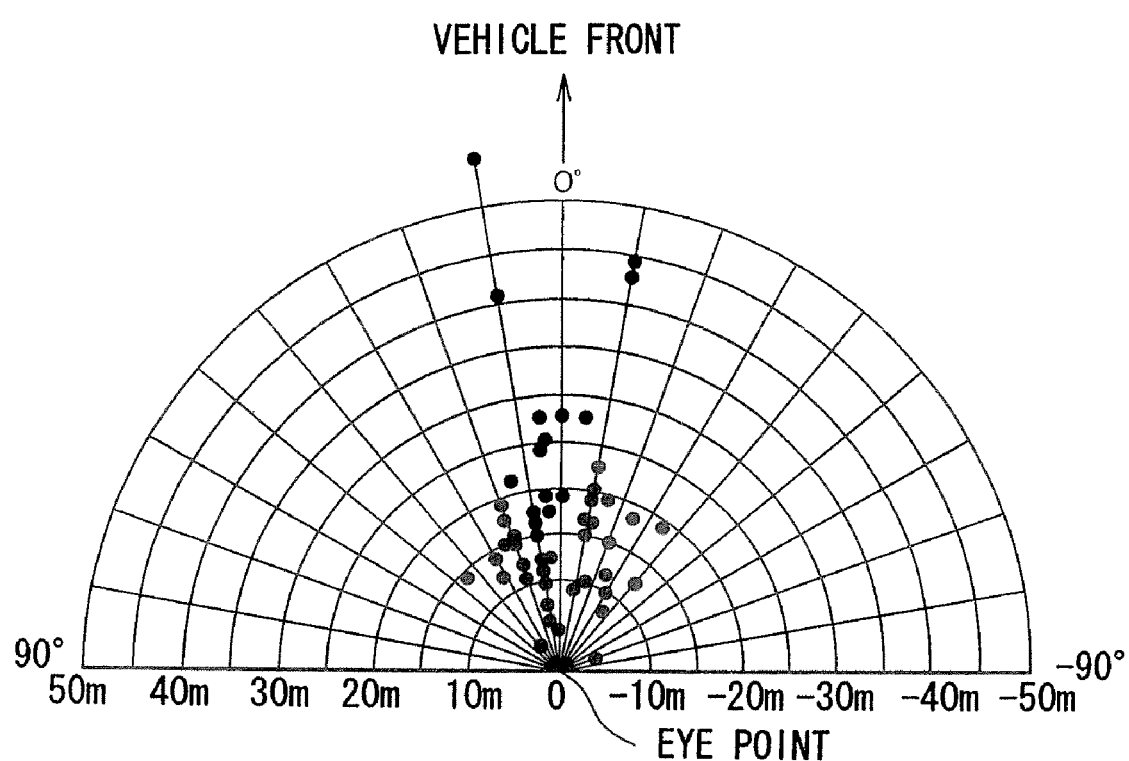
FIG. 2 is a diagram showing the result of analysis of pedestrian accident in past in front of the vehicle using the eye point of a driver.
Figure 3:
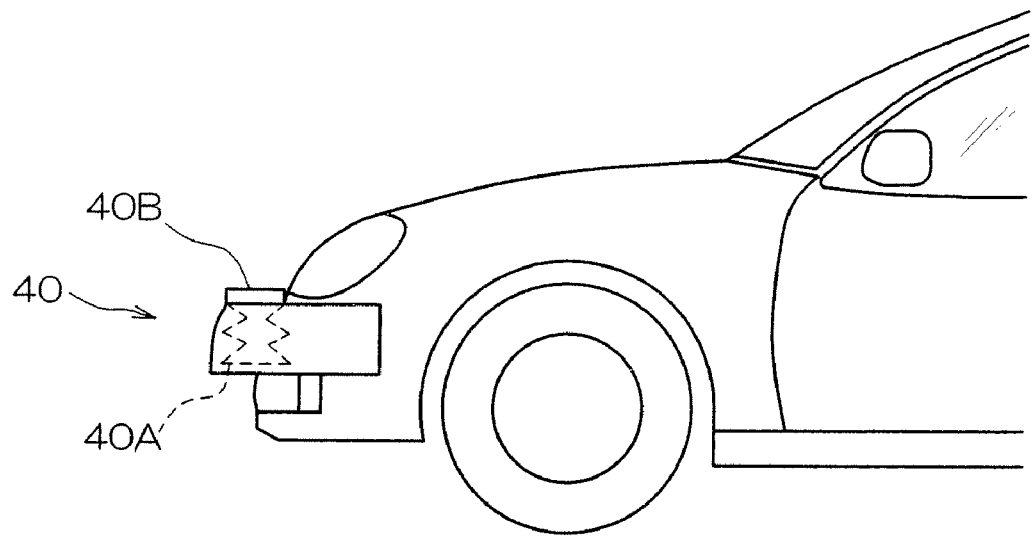
FIG. 3 is a side view showing a state of a pedestrian protection device being accommodated in a bumper.

FIG. 2 shows the result of analysis of pedestrian accident in past in front of the vehicle using the eye point of a driver. As can be understood from FIG. 2, since pedestrian accidents are concentrated in a range of 60° for each of the right- and left-hand angles of visibility and in the range of front 40 m, it is preferable that a shooting range of the front camera and a detection range of the laser radar for detecting a front obstruction are the range of 60° for each of the right- and left-hand angles of visibility and within range of front 40 m.

Position data indicative of a position of the driver's vehicle is output from the GPS 22 and is input to the control device 24. The control device 24 reads map information including data of a road shape stored in a map database 34, and shows the position of the driver's vehicle on a map indicated with the read map information. Since data of the road shape is included in the map information, it is possible to obtain a position of the detected obstruction on a road.

An action prediction database 26 is connected to the control device 24. Data indicating the probability of the presence of an obstruction, and data, such as an action prediction model which predicts the action of the obstruction, such as a pedestrian action prediction model which predicts the action of a pedestrian, are stored in the action prediction database 26.

The pedestrian action prediction model will be explained. The inventors analyzed actions of pedestrians at the time of accident. As a result, the actions of pedestrians could be classified into the following four cases (i), (ii), (iii) and (iv). That is: (i) a pedestrian assumed that the driver would stop the vehicle and kept on walking; (ii) a pedestrian became aware of the approach of a vehicle and stopped moving (walking, running, etc.); (iii) a pedestrian became aware of the approach of a vehicle and tried to stop but could not stop; and (iv) a pedestrian became aware of approach of a vehicle but he or she could not take any action, or the like. The frequency of the case (i) was the highest, followed by (ii), (iii) and (iv), in this order. From this analysis result, it can be expected that when a pedestrian is walking and running in a situation in which the crisis of occurrence of an accident approaches, the probability is highest that the pedestrian will continue in their current state, i.e., the walking or running state, and the probability that the pedestrian will take the action decreases in the order of the above-mentioned (i), (ii), (iii), and (iv).

Thus, in this example, an action prediction model indicating probabilities of actions (i) to (iv) is previously stored in the action prediction database 26 as the pedestrian action prediction model, and when a pedestrian is detected as an obstruction as will be described later, future action of the pedestrian is predicted based on the pedestrian action prediction model stored in the action prediction database by the control device. According to the result of analysis of the pedestrian accident, many pedestrians who encountered accident continued the state of movement of just before the accident. Thus, only a model in which a pedestrian continues the state of movement of just before accident is used as the pedestrian action prediction model, or a model in which a pedestrian continues the state of movement of just before accident may used and other models may be used as auxiliary ones.

When a pedestrian is sleeping or lying on a road, when a pedestrian is heavily drunken, or when a pedestrian is wandering around, it is predicted that the current state is kept also in the future, and therefore an prediction model indicating that such a current state is kept is also stored in the action prediction database 26.

The control device 24 is connected to vehicle-mounted devices which carry out an avoidance action of the driver's vehicle from an obstruction and a damage minimization action by controlling at least one of a steering angle, a braking force and a driving force of the driver's vehicle in coordination. As the vehicle-mounted devices, there are provided an active front and rear wheel steering angle control device 28 for independently controlling steering angles of front and rear wheels, a hydraulic brake pressure circuit 30 for controlling a braking force by controlling the hydraulic brake pressure, and a throttle opening degree control device 32 for controlling the driving force by controlling the opening degree of the throttle valve. A hydraulic sensor 30A is mounted on the hydraulic brake pressure circuit 30. The hydraulic sensor 30A detects a braking force by detecting hydraulic pressure (pressure in a master cylinder) of the master cylinder which is proportional to a pressure obtained when a driver depresses a brake pedal. A steering angle control device, which controls a steering angle of only the front wheel, may be used instead of the active front and rear wheel steering angle control device.

Figure 9:
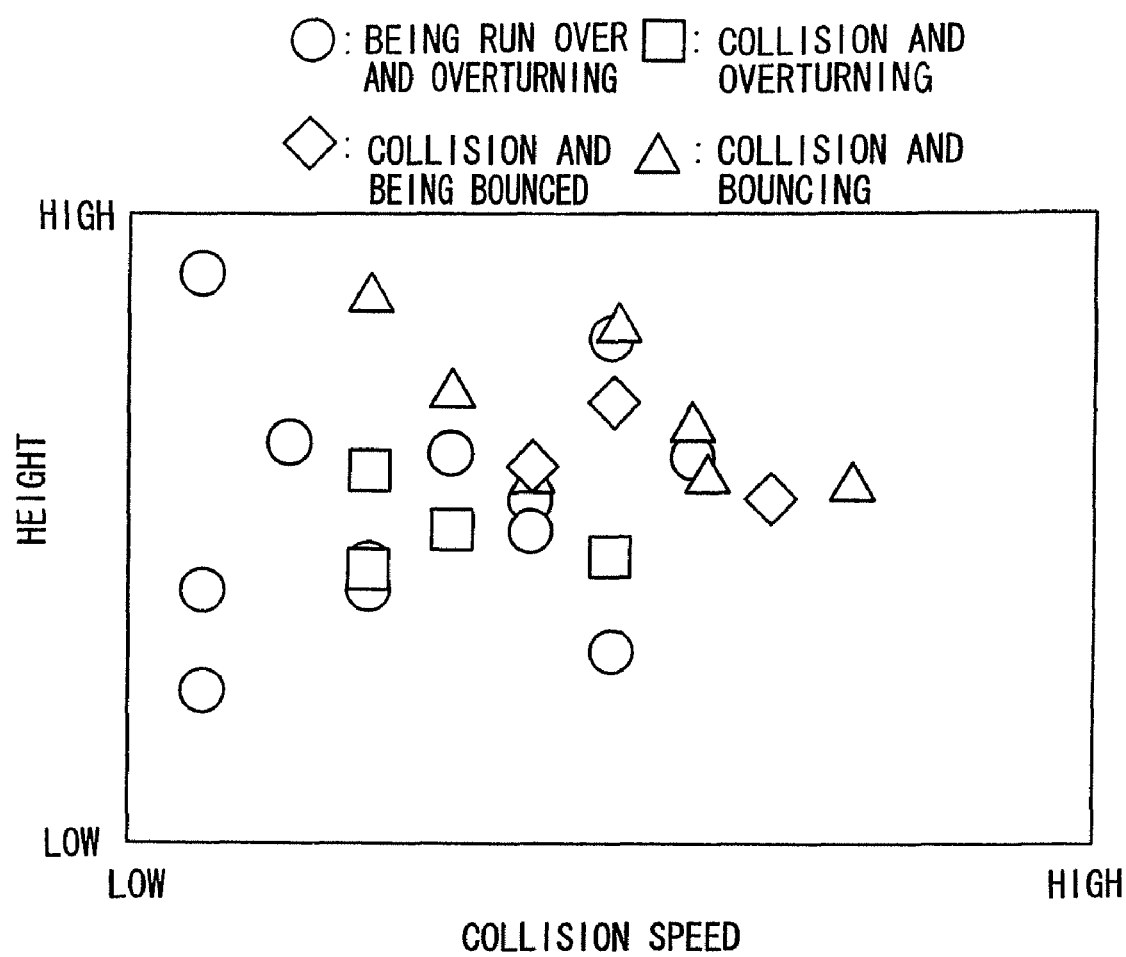
FIG. 9 is a diagram showing pedestrian behaviors at the time of collision in correspondence to the collision speeds and heights of pedestrians.

The inventors analyzed the accident investigation data in detail and investigated the pedestrian behavior at the time of accident. As a result, it was found that the pedestrian behavior at the time of collision was largely varied depending upon the collision speed, the height of a pedestrian, a shape of a front surface of a vehicle and the like as shown in FIG. 9. In the analysis, behaviors of pedestrians at the time of collision are classified into four behaviors, i.e., collision and overturning, being run over and overturning, collision and bouncing, collision and jumping. As shown in FIG. 9, when the collision speed is low, the overturning after collision is a main behavior, and a probability that a pedestrian is bounced on a hood is low. When the collision speed is increased, a pedestrian is bounced on a hood and drops on a road surface. In an intermediate region of these speeds, these behaviors are mixed.

Figure 10:
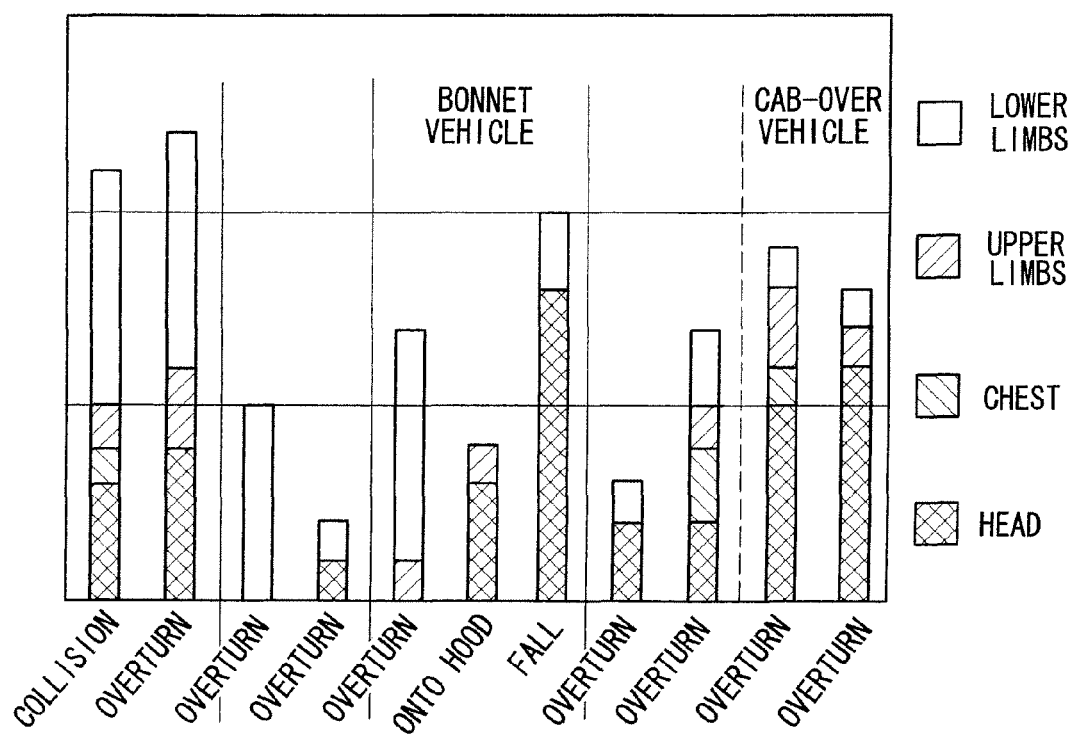
FIG. 10 is a graph showing a result of investigation of injury situation for each of the pedestrian behaviors at the time of collision shown in FIG. 9.

A injury situation for each of the types of pedestrian behavior at the time of collision shown in FIG. 9 was investigated. A result is shown in FIG. 10. According to the result of the analysis shown in FIG. 10, when a pedestrian is bounced on a hood after collision, it can be found that a probability that a head and a face of the pedestrian are damaged by drop from the hood is especially high. In other similar collision behaviors also, it is found that a probability of damage of a head and a face caused by collision against a road surface is high.

Based on the analysis result, in this example, in order to prevent a head and a face from being damaged when a vehicle collides against a pedestrian and the pedestrian is bounced and drops and collides against the road surface, a pedestrian protection device is provided which controls a behavior of a pedestrian at the time of collision, prevents the pedestrian from being bounced, and prevent the pedestrian from dropping onto a road surface from high position.

As shown in FIGS. 3 to 6, a pair of pedestrian protection devices 40 is provided on a front face side of a vehicle. Each of the pedestrian protection devices 40 is folded and accommodated in the bumper of the vehicle. The pedestrian protection device 40 includes an air bag element 40A, which is expanded and developed when an inflator is operated, and a plate-shaped pedestrian behavior controller 40B which is fixed to the air bag element 40A and which is made of elastic material such as rubber. The pedestrian protection devices 40 independently can operate the inflators and develop the air bag bodies 40A independently. Each inflator, which is an operating section of the pedestrian protection device 40, is connected to the control device 24.

Figure 4:
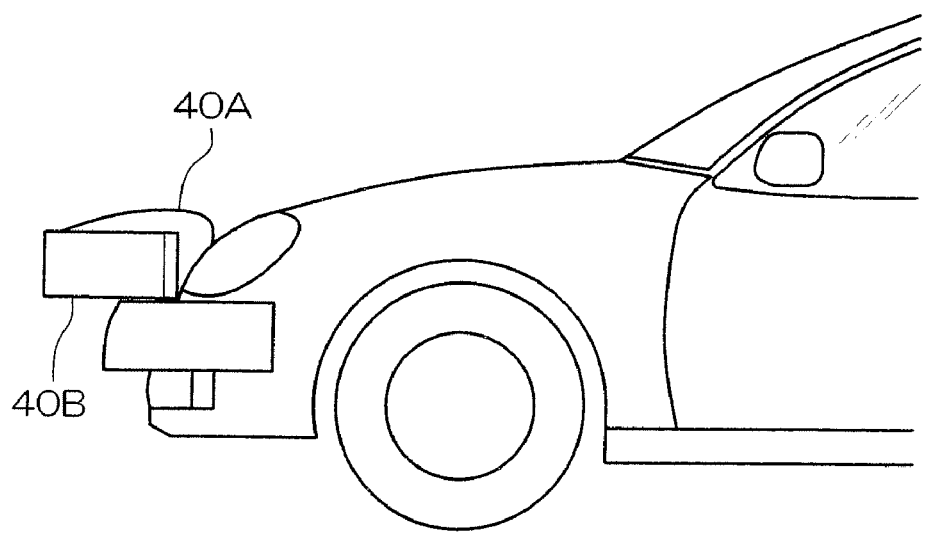
FIG. 4 is a side view showing a state of the pedestrian protection device being developed.
Figure 5:
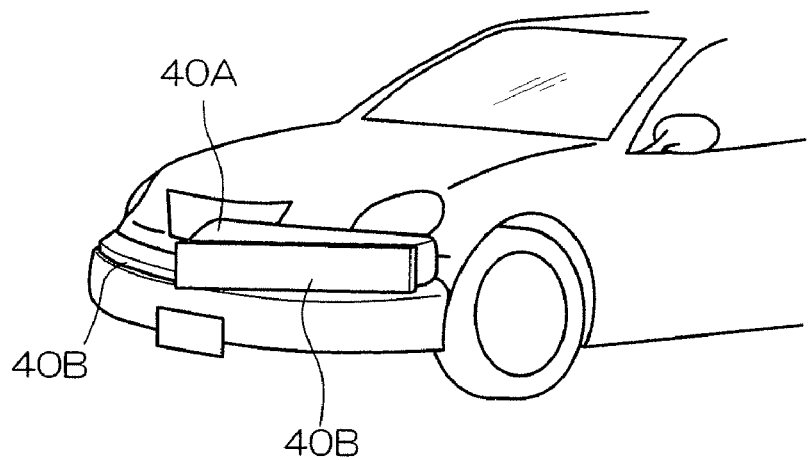
FIG. 5 is a perspective view showing a state of the pedestrian protection device being developed.
Figure 6:
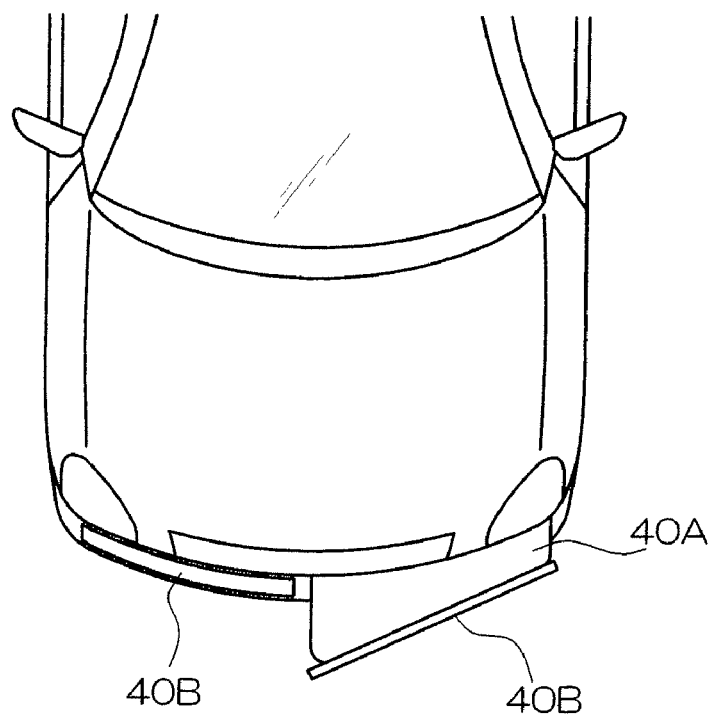
FIG. 6 is a plan view showing a state of the pedestrian protection device being developed.

The pedestrian behavior controller 40B is horizontally positioned on an upper face of the bumper in a state in which the air bag element 40A is folded and accommodated in the bumper. When the air bag element 40A is developed as shown in FIGS. 4 to 6, a vehicle center side of the pedestrian behavior controller 40B is projected more toward the vehicle front than a vehicle lateral side of the pedestrian behavior controller 40B is, and an upper face of the pedestrian behavior controller 40B is oriented in the vertical direction. Thus, the pedestrian behavior controller 40B laterally pushes out a pedestrian existing in front of the vehicle, the pedestrian behavior controller 40B controls the behavior of the pedestrian at the time of collision, and prevents the pedestrian from being bounced on a hood of the vehicle.

Although the case in which the pedestrian protection device is constituted using the single plate-shaped pedestrian behavior controller has been explained above, a plurality of plate-shaped pedestrian behavior controllers disposed in the widthwise direction of the vehicle may be used. In such a case, a size of the central vehicle side of the pedestrian behavior controller is set larger than that of the lateral vehicle side of the pedestrian behavior controller.

The pedestrian behavior controller can be mounted on a tip end of an accumulator to change the mounting angle by controlling the extension of the accumulator. Further, the pedestrian behavior controller may also be disposed such that it is divided in the vertical direction of the vehicle, for control of the pedestrian behavior.

Figure 7:
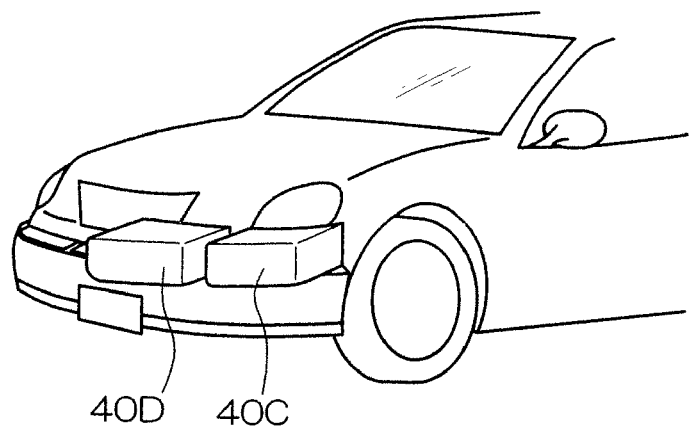
FIG. 7 is a perspective view showing a state of the other pedestrian protection device being developed.
Figure 8:
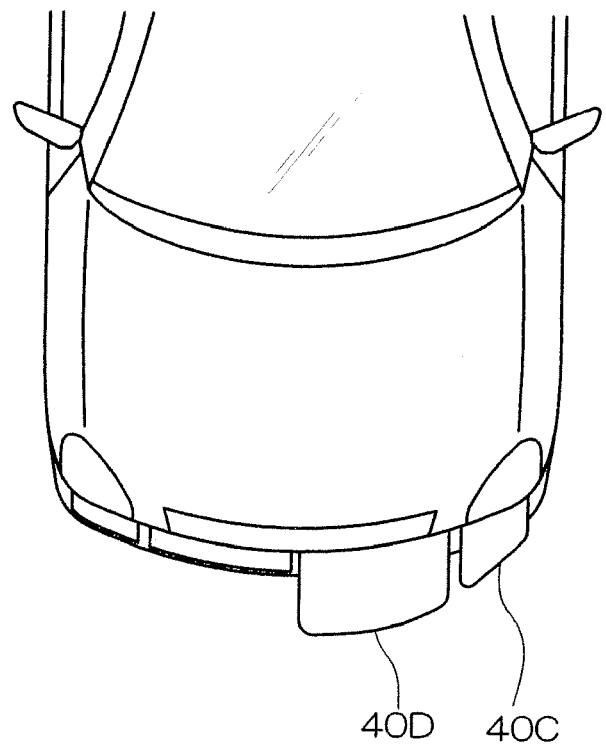
FIG. 8 is a plan view showing a state of the other pedestrian protection device being developed.

Although the case in which the pedestrian protection device 40 comprises the air bag element and the pedestrian behavior controller has been explained above, each of the pedestrian protection devices 40 may be folded and accommodated in the bumper, and the pedestrian protection device 40 may comprise a pair of air bag elements 40C and 40D which are developed when inflators are operated as shown in FIGS. 7 and 8. Since a capacity of the air bag element 40D on the central vehicle side is larger than that of the air bag element 40C on the lateral vehicle side, and in a state in which the air bag elements 40C and 40D are developed, the air bag element 40D on the central vehicle side is more projected toward the vehicle front than the air bag element 40C on the lateral vehicle side is, the air bag elements 40C and 40D laterally push out a pedestrian existing in front of the vehicle, the air bag elements 40C and 40D control the pedestrian behavior after collision and prevents the pedestrian from being bounced onto the hood.

A cubic shape, a straw-bag shape or a spherical shape can be employed as a shape of the air bag element. Although the plurality of air bag bodies were used in the above explanation, a single air bag element may be used as shown in FIGS. 3 to 6.

When the plurality of air bag bodies is to be used, the development state can be changed by controlling the inflator pressure and the flow rate of the air bag element.

A back supporting section may be mounted on a tip end of the accumulator to change the mounting angle by controlling the extension of the accumulator. In addition, the air bag bodies may be divided also in the vertical direction of the vehicle such that the pedestrian behavior can be controlled.

A pedestrian walks or runs, but the pedestrian may keep the current movement state, i.e., walking state or running state in the future, or may change the moving state suddenly. Further, the moving direction may suddenly be changed in some cases. Therefore, it is not easy to predicate the future trajectory using the action prediction database. Hence, in this example, a collision state between the pedestrian protection device and a pedestrian is detected, the pedestrian protection device is controlled in accordance with the collision state, and the collision behavior of the pedestrian is controlled such that the pedestrian after collision is not bounced onto a hood and the pedestrian moves sideway of the vehicle. Control of the pedestrian protection device includes controls of angles such as a yaw angle and a pitch angle of plane opposed to the pedestrian.

Figure 11A:
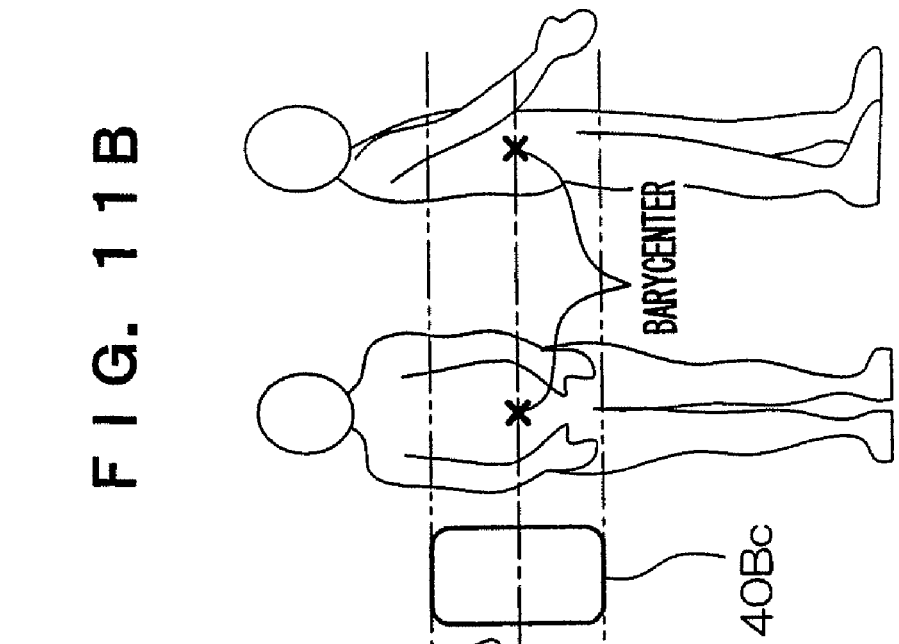
FIG. 11A is a diagram showing a positional relation between a pedestrian behavior controller of the pedestrian protection device and barycenter of pedestrian.
Figure 11B:
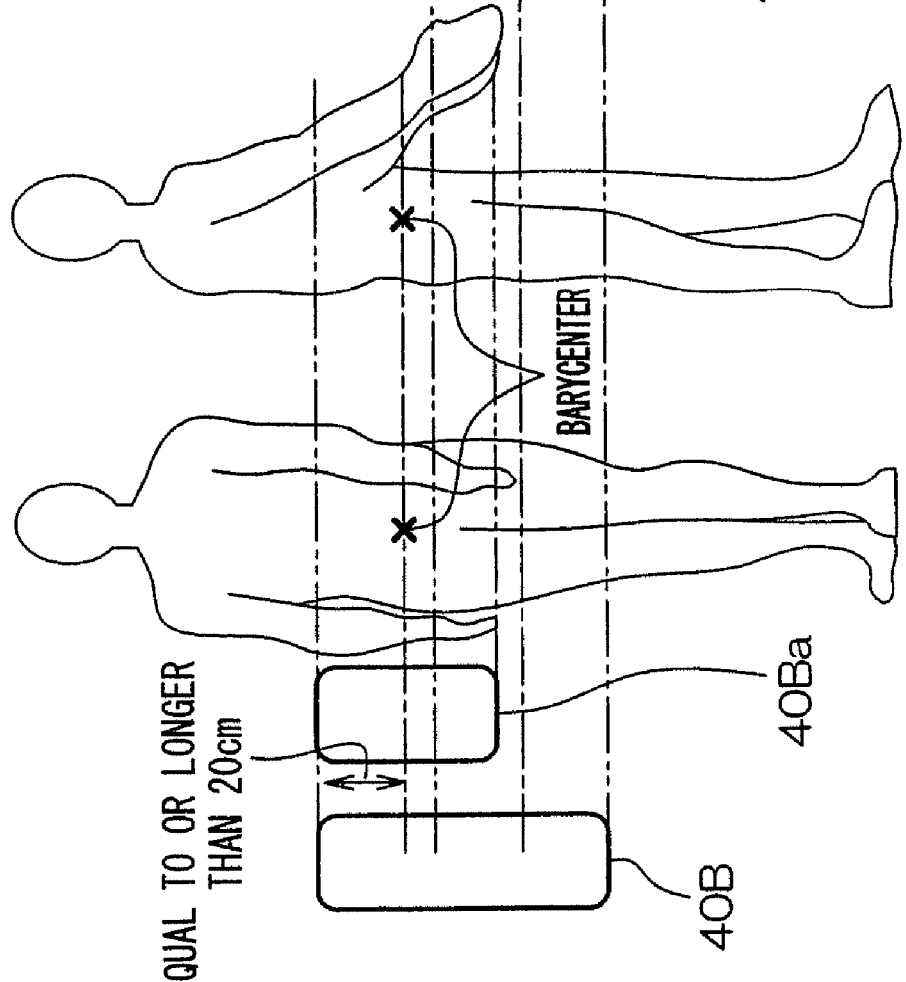
FIG. 11B is a diagram showing a positional relation between a pedestrian behavior controller of the pedestrian protection device and barycenter of pedestrian.

If the vertical disposition position of the pedestrian behavior controller is changed and behaviors of pedestrians are compared, when the pedestrian behavior controller is disposed downward, since a lower portion of the pedestrian than a barycenter of the body of the pedestrian and a controller surface of the pedestrian behavior controller collide against each other, the pedestrian behavior at the time of collision becomes such a behavior that the pedestrian is bounded. When a higher portion of the pedestrian body than the barycenter of the body of the pedestrian and the controller surface collide against each other, the pedestrian behavior at the time of collision becomes such a behavior that the pedestrian is pushed from above. In this case, the pedestrian does not move sideway of the vehicle, and the pedestrian becomes entangled with a lower portion of the vehicle. Thus, in order to control the behavior of a pedestrian, it is necessary to dispose the controller surface of the pedestrian behavior controller so as to collide against a portion of a pedestrian near his or her barycenter. FIG. 11 shows positional relation between barycenters of pedestrians and the pedestrian behavior controller. In order to control behaviors of a child and an adult, the pedestrian behavior controller 40B of the example has such a size that when the air bag element is developed, both a body side region including a barycenter of the child and a body side region including a barycenter of the adult can be covered. Alternatively, a pedestrian behavior controller 40Ba having such a size that a body side region including a barycenter of only an adult can be covered or a pedestrian behavior controller 40Bc having such a size that a body side region including a barycenter of only a child can be covered may be used.

An angle at the time when the pedestrian behavior controller collides against a pedestrian is influenced by a pedestrian behavior. FIG. 12 shows a result of investigation of an influence of an impact force on a head in the case in which a mounting angle of the pedestrian behavior controller is changed. FIG. 12 shows a result in the case in which the collision speed is 40 km/h. According to the result shown in FIG. 12, there is a tendency that as the collision angle between the pedestrian and the pedestrian controller surface is smaller, the peak value of the initial impact force becomes larger. There is a tendency that as the collision angle at the time of collision against a road surface becomes larger, and the peak value of the impact force becomes larger. This is because that when the collision angle is large, a contact range between the pedestrian and the control surface of the pedestrian behavior controller becomes wide, and therefore the pedestrian behavior is easy to become irregular. Therefore, the collision angle of the pedestrian behavior controller is determined while taking the above-described factors into account.

When the vehicle is carrying out the avoidance action, the collision angle between the pedestrian behavior controller and a pedestrian is different from the case in which a vehicle is perfectly opposed to the pedestrian. Therefore, it is preferable to control the collision angle while taking the avoidance action of the vehicle into account. In this case, also when the vehicle is carrying out the avoidance action, since the behavior of the vehicle is not suddenly changed, it is possible to determine the collision angle based on the collision state between the vehicle and the pedestrian predicted by collision process estimation means.

Next, a control routine for controlling action of the driver's vehicle of the example will be explained. In this example, a control is carried out such that obstruction avoidance action and damage minimization action are carried out.

[Obstruction Avoidance Action Control]

Figure 13:
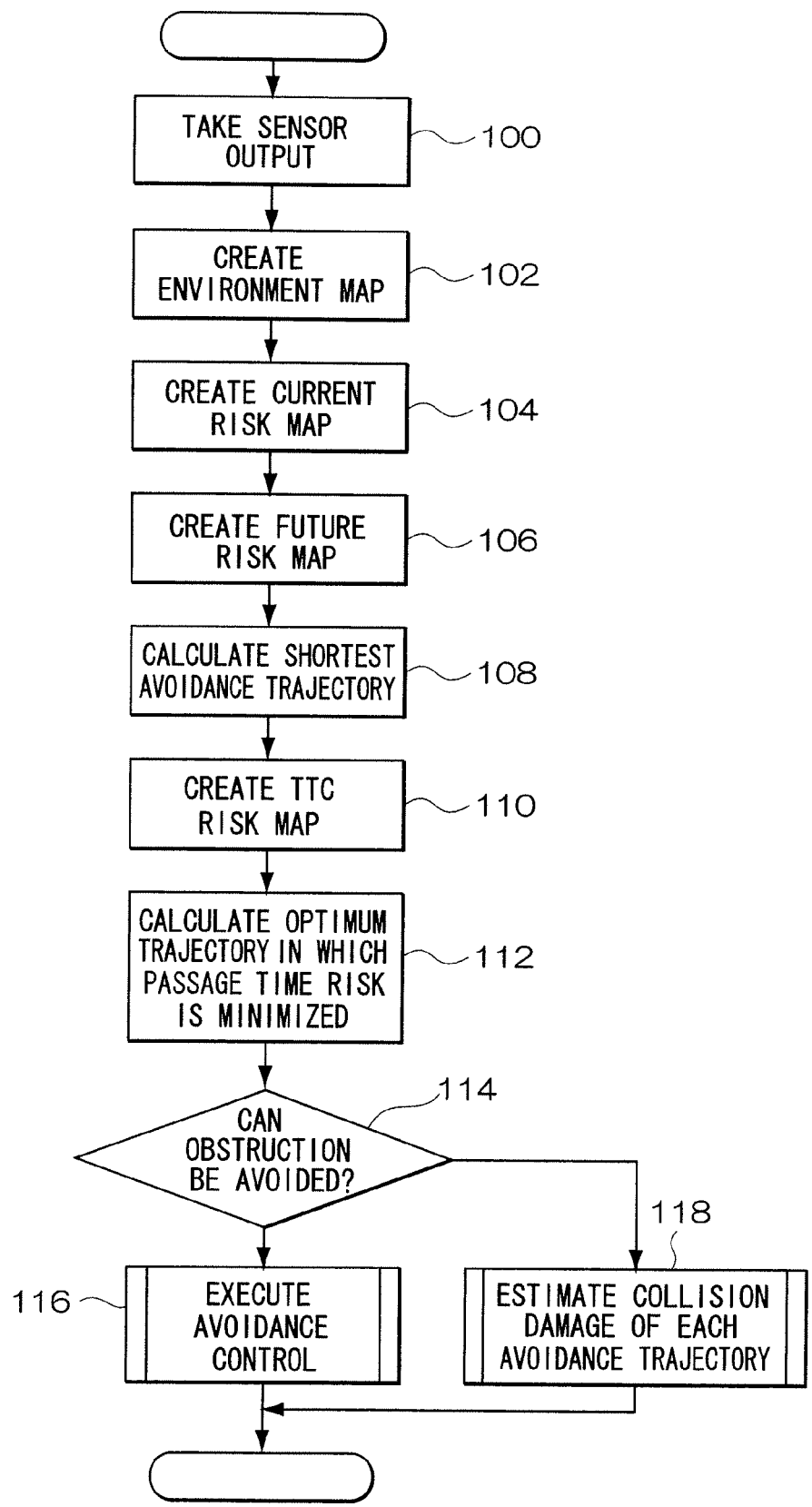
FIG. 13 is a flowchart of a vehicle motion control routine for controlling vehicle motion of the example.

First, the obstruction avoidance action control for controlling action of a vehicle so as to avoid an obstruction will be explained with reference to FIG. 13. At step 100, the data detected by the group of sensors for detecting the travel state of the driver's vehicle and detected by the group of sensors for detecting the environment state is taken in, and at step 102, on the data detected by the group of sensors which detect the environment state, an environment map including a road shape and obstructions is created by using the map information stored in the map database 34 and by using a position of the driver's vehicle which is inputted from the GPS 22 as a reference.

When creating the environment map, a map for a front side of the driver's vehicle is created based on data from the front camera and the laser radar, a map for a lateral side of the driver's vehicle is created based on data from the side camera, a map for a rear side of the driver's vehicle is created based on data from the rear camera, and the front map, the side map and the rear map are synthesized, thereby creating an environment map for the whole.

For the map for the front side of the driver's vehicle, by using the distance data from the driver's vehicle to the obstruction in front, and the data indicating the direction of presence of the obstruction referenced to the driver's vehicle that have been taken in from the laser radar 20, and the image data for the driver's vehicle front that has been inputted from the camera 18, and by edge processing of the image portion including the position (the distance from the driver's vehicle to the obstruction), and the like, the subject existing in the position detected by the laser radar 20 is extracted as an obstruction.

Since the obstruction is extracted by the image processing of the image portion including the position detected by the laser radar 20, it is possible to detect the size and the type, and like, of the obstruction defected in addition to the position of the obstruction detected by the laser radar. Thereby, a pedestrian crossing in front of the driver's vehicle and a two-wheeler traveling in front of the driver's vehicle are extracted as obstructions. When the obstruction is a pedestrian, pedestrian information (attribute of the pedestrian) such as the age, the gender, whether the pedestrian has belongings, and a direction of the line of sight in addition to the size (height and weight) is detected, variation in position of the pedestrian, and like, is predicated, and therefore it is possible to predicate the movement of the pedestrian and the will of the pedestrian, such as in which direction the pedestrian intends to move, or the like.

The pedestrian information may be sent to the vehicle from the group of environment sensors provided on the roadside by means of communication between vehicles and road, or a pedestrian may have a radio tag in which pedestrian information is stored and the information may be sent from the radio tag to the vehicle.

For the map for the rear side of the driver's vehicle, other vehicles which approach from the rear of the driver's vehicle on the same lane as that of the driver's vehicle and the lane adjacent to the lane of the driver's vehicle are extracted, and a map including the other vehicles extracted is created by image processing, such as pattern matching, or the like, of the image data from the rear camera which shoots a rear side of the driver's vehicle. The side map for the lateral side of the driver's vehicle can also be created in the same way as that for the map for the rear side of the driver's vehicle.

Figure 14:
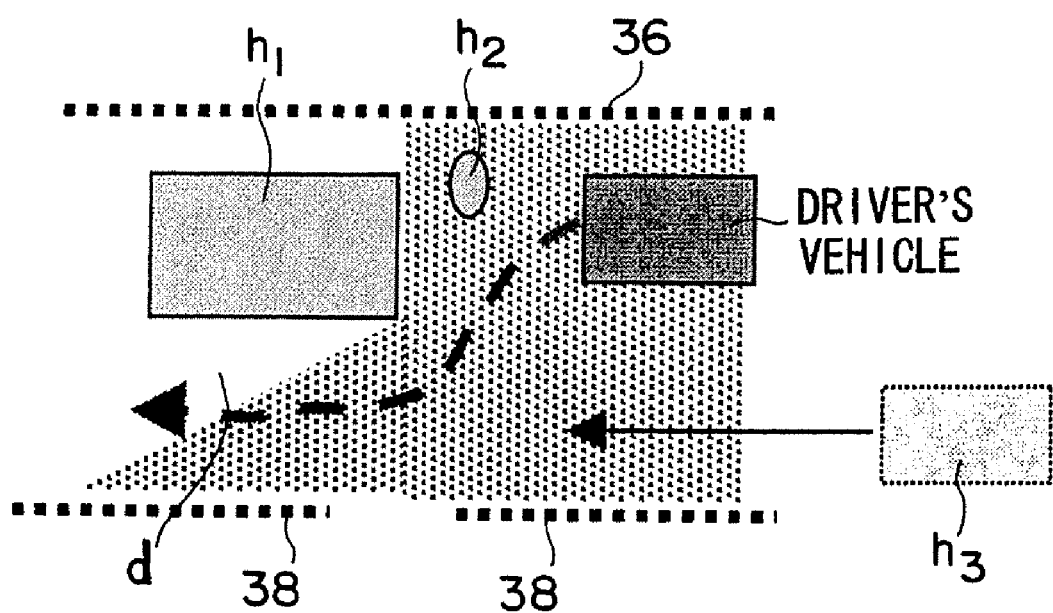
FIG. 14 is a diagram showing an example of the environment map.
Figure 15:
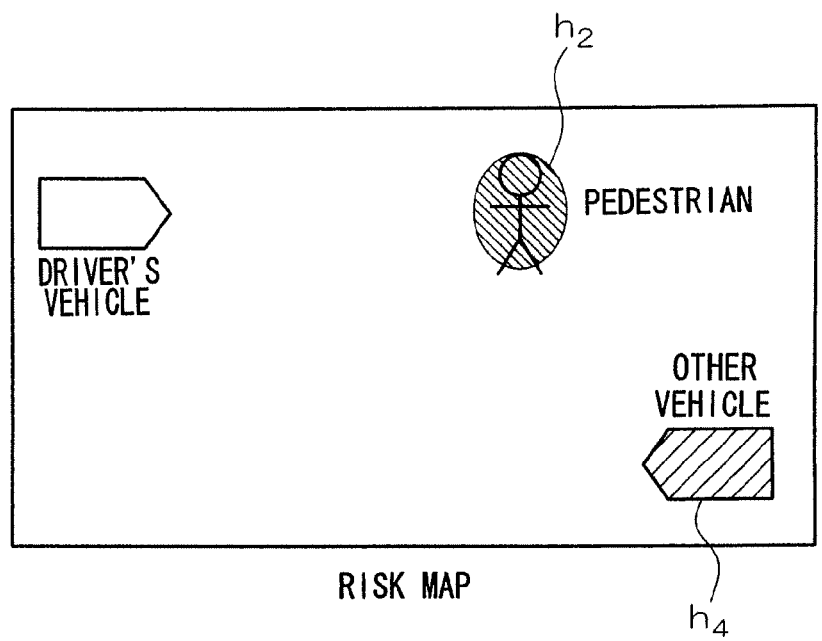
FIG. 15 is a diagram showing an example of a risk map describing the degree of risk and the risk region.

FIG. 14 shows an example of the environment map which is created in the above-described way. A front vehicle h1 and a pedestrian h2 which are extracted as obstructions are displayed on a front side of the driver's vehicle in the environment map, a rear vehicle h3 is displayed on the rear side of the driver's vehicle, a median strip 36 and guardrails 38 are displayed in a region including a lateral side of the vehicle, and a free space in which a vehicle can enter is displayed between the guardrails 38. Further, a dead angle region d, which cannot easily be detected by the group of sensors, is generated in the left lateral side with respect to the traveling direction of the front vehicle. The dead angle region d is a region, such as a lee, or the like, which cannot be sensed by a camera or a laser radar such as a lee, and this region may be generated by a trouble of a sensor caused by bad weather.

Figure 16:
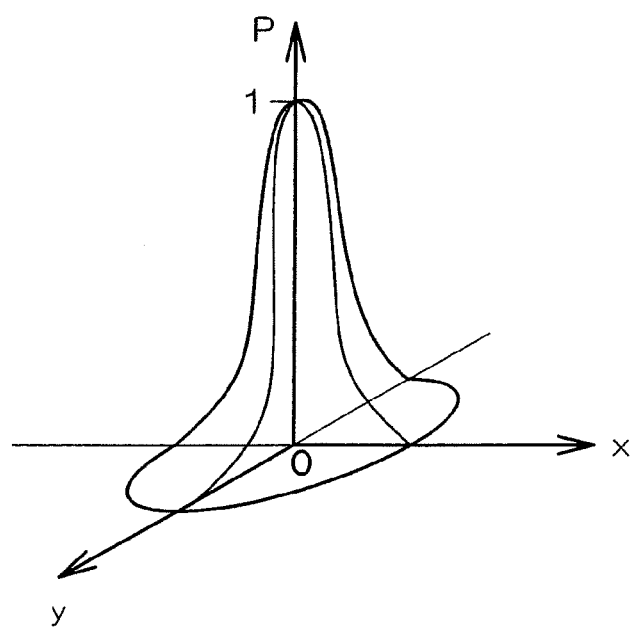
FIG. 16 is a diagram showing a distribution of probability of presence.

At next step 104, a risk map indicating a risk at the current time is created corresponding to a type of an obstruction using the environment map which displays obstructions, being created in the above-described way. The risk map is displayed by giving, to the environment map, a risk region and a degree of risk determined stepwise in the risk region. As shown in FIG. 16, the respective sets of positional coordinates (x, y) in the risk map are provided with a distributed probability P (a value of 0 to 1) of presence of an obstruction, where the position where an obstruction exists is 1 and the probability is gradually decreased to 0, and the region where the value of probability of presence exceeds 0 are displayed as the risk region. A standard degree of risk which is set corresponding to a type of an obstruction, with degree being changed corresponding to a type of the obstruction (e.g., a pedestrian is provided with a higher degree of risk than is given to a oncoming vehicle), and even if obstructions are the same type, they can be provided in a plurality of stages. In this example, the risk is numerically provided in three steps, i.e., high, medium and low (e.g., high: 3, medium: 2 and low: 1).

Figure 17:
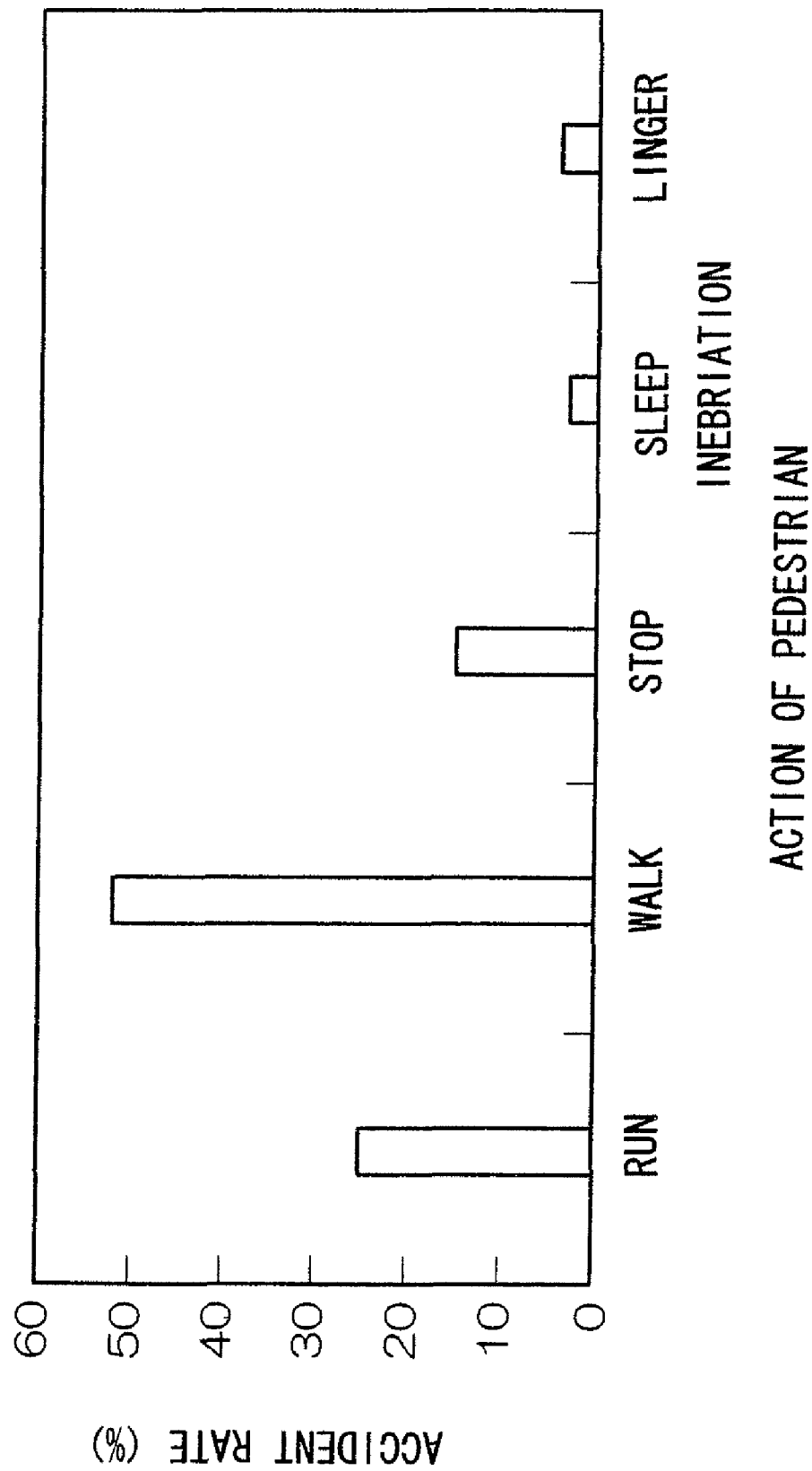
FIG. 17 is a graph showing a result of analysis of actions of pedestrians at the time of accident based on accident investigation data.

Action of a pedestrian at the time of accident was analyzed from the accident investigation data. FIG. 17 shows a result of the analysis. As shown in FIG. 17, as the actions of pedestrians, walking action occupies 50% or more, and rates of actions such as running and stop, and the like, become higher. Therefore, the actions of pedestrians can be classified into three types, i.e., walking, running and others.

If the information is sorted on the basis of this classification for each of road environments, Table 1 can be obtained.

TABLE 1

| Road type Action | Pedestrian | | | | | |
|---|---|---|---|---|---|---|
| | Right to left (vehicle reference) | | | Left to right (vehicle reference) | | |
| | Walking | Running | Stopping, heavily drunken or others | Walking | Running | Stopping, heavily drunken or others |
| Straight road | ◎ | ◎ | Δ | ◎ | ○ | Δ |
| Straightly moving at intersection | ○ | Δ | Δ | Δ | Δ | 0 |
| Turn to right at intersection | ○ | Δ | Δ | Δ | Δ | 0 |
| Turn to left at intersection | 0 | Δ | 0 | Δ | 0 | 0 |

◎: Rate high
○: Rate medium
Δ: Rate low

This table shows an occurrence ratio of accidents based on each of the road environments and the pedestrian actions. According to the result shown in Table 1, it can be understood that when a pedestrian crosses a straight road from right to left, the probability that the pedestrian encounters accident during walking is the highest.

If the occurrence ratio of the pedestrian accident for each of time zones is checked from the result of analysis of the accident investigation data, it can be found that the accident occurrence ratio is increased from nightfall, it is maintained at high level during night, and the accident occurrence ratio is lowered from sunrise. It is also found that the accident occurrence ratio is varied depending upon weather.

That is, if the probability of presence of obstruction is defined as P and a standard degree of risk (initial value) corresponding to a type of an obstruction is defined as Do, the final risk D is calculated by the following formula, using, as correction coefficients, a correction value $H_1$ in accordance with predicted behavior of an obstruction, a correction value $H_2$ in accordance with an accident occurrence ratio and a correction value $H_3$ in accordance with weather:

$$D = P \cdot Do \cdot H_1 \cdot H_2 \cdot H_3 \quad (1)$$

Action of an obstruction can be predicted based on an action prediction model stored in the action prediction database, and for a pedestrian, as shown in FIG. 17, an accident rate of running and walking is higher than that of stop, and therefore it is estimated that a probability that the current action is continued, and the correction value H1 of walking and running is set at larger value than that of stopping is set.

The pedestrian state can be determined by such as a camera, or the like, which is external environment sensors. For example, when the height of an obstruction on a road surface is about 30 cm, which is almost equivalent to a human body thickness, and a lateral width is about 1 to 2 m and heat generation is detected by an infrared camera, or the like, it can be determined that a pedestrian is lying down (sleeping) on the road surface. When a moving path and the moving speed of the pedestrian irregularly vary, it can be determined that the pedestrian is in a state of heavily drunken or wandering around.

The correction value $H_2$ is set such that a road shape is obtained from the map information around the driver's vehicle obtained by the GPS, the current action of the pedestrian is obtained by image processing of image taken by the camera, the accident occurrence ratio corresponding to the road shape and the action of the pedestrian is obtained based on Table 1, and the obtained accident occurrence ratio corresponds to the correction value $H_2$. In this case, as the accident occurrence ratio is higher, the risk is higher and thus, as the accident occurrence ratio is higher, the correction value $H_2$ is set at a larger value.

The correction value H3 corresponding to the weather is set in accordance with weather detected by the weather sensor and time. When one fine day is set as a unit, the correction value H3 is set such that it is increased from nightfall to night, and it is maintained at the highest value during night, and the correction value H3 is lowered from sunrise. For a rainy day, a correction value which provides higher risk than a correction value for a fine day provides risk is set. Since the pedestrian action may vary depending upon the road environment, weather and time zone in some cases, it is possible to improve the predication precision of the risk by correcting action predicated based on information of the road environment, weather and time zone.

Figure 18:
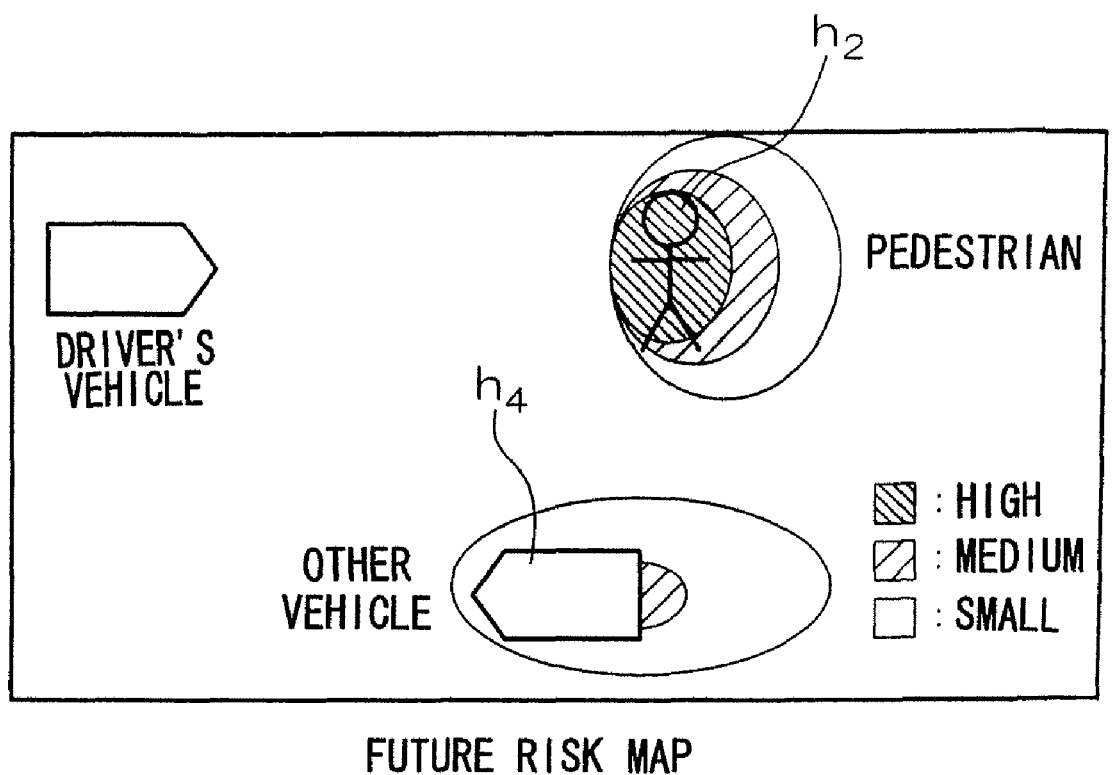
FIG. 18 is a diagram showing an example of a future risk map.

FIG. 18 shows an example of a risk map in which a risk region and a standard degree of risk are superposed on the environment map on which a pedestrian h2 and an oncoming vehicle h4 are displayed. Among types of obstructions, risk of a pedestrian is the highest, and therefore a standard degree of risk of the pedestrian is set at the highest value ("high" in this example). The probability of presence in the traveling direction with respect to the oncoming vehicle is high, and therefore a risk in which a long axis extends along the traveling direction and a standard degree of risk ("medium" which is lower risk than that of the pedestrian in this example) are set.

At next step 106, a future risk map (risk map expressed with time function) showing the probability of presence of an obstruction after T seconds and a risk after T seconds is created from the current risk of an obstruction, based on a current risk map, a action prediction database in which data for predicting behavior of an obstruction including data showing the probability of presence of the obstruction in accordance with time is stored, and a distance between the driver's vehicle and an obstruction after predicted predetermined time (T seconds).

The future risk map is created by estimating a position of an obstruction after T seconds based on moving speed information (speed vector information) of an obstruction. That is, when the obstruction is moving, since it is possible to estimate a position of the obstruction after T seconds based on the moving speed information of the obstruction, the future risk map is created in accordance with the position of the obstruction estimated based on the moving speed information.

There is a probability that the speed information of the obstruction is changed, such as an obstruction such as a pedestrian and an oncoming vehicle, and the like, carries out the avoidance action in accordance with the current risk situation, and the like. Therefore, based on the information about the movement speed of the obstruction at the current point of time, the speed of the driver's vehicle, the relative position between the driver's vehicle and the obstruction, and the like, and the data, such as the action prediction model, and the like, which are previously stored in the action prediction database, and from the possibility that the obstruction takes an avoidance action, the estimated position after T sec when the avoidance action has been taken, and the like, the position of the obstruction after T sec is obtained as a distribution of the probability of presence of a map, and further by numericalizing the risk possessed by the obstruction in the same way as described above (for example, giving 3 for high, 2 for medium, and 1 for low), and multiplying it by the probability of presence, a risk map after T sec is created.

If an obstruction, which is detected at current point of time, exists, a region where there is a possibility that an obstruction exists in accordance with behavior of the obstruction after T seconds from the movement of the obstruction is widened, and therefore the risk region of the future risk map is given to the moving obstruction such that the risk region becomes wider. In addition, since it is expected that the risk be reduced due to the action for avoiding the detected obstruction, and like, the risk is given such that the outer risk region is smaller than the inner risk region.

FIG. 18 shows an example of the future risk map. For the pedestrian h2, a risk region is given such that the risk region is gradually enlarged based on the current risk region as a reference, and a risk of each risk region is given such that the risk is gradually reduced based on the current risk as a reference. For the oncoming vehicle h4, a risk region and a risk are given to the oncoming vehicle h4 in the same way as for the pedestrian h2, with the region in which there is a possibility of existence being widened, and the risk region being also widened, and with the possibility of the avoidance action, such as braking, or the like, of the oncoming vehicle h⁴, being taken into account.

When the obstruction is a pedestrian, at least one of the age and the direction of the line of sight is checked, and the probability of presence of the obstruction after the predetermined time is corrected based on the result of the check. Thereby, the precision of the behavior prediction is improved, and it is possible to predict the future risk more precisely.

At next step 108, using a lateral position of the driver's vehicle on a road on basis of the position of the current driver's vehicle as a reference, i.e., avoidance lateral position as a parameter, a shortest avoidance trajectory in the case in which the shortest control for moving driver's vehicle to each of the lateral positions is carried out is calculated. The shortest avoidance trajectory can be obtained uniquely in accordance with a vehicle speed of the driver's vehicle (longitudinal speed with respect to a road), lateral speed, a friction coefficient between a tire and a road surface (road surface μ), and the distance between the avoidance lateral position and the lateral position of the driver's vehicle. When the shortest avoidance trajectory is to be obtained, it is preferable that the size of the critical friction circle of each wheel is estimated, and the shortest avoidance trajectory is obtained such that the tire generating force of each tire becomes the maximum, based on the estimated size of the critical friction circle of each tire.

The shortest avoidance trajectory in case in which a friction force between a tire and a road surface is utilized at the maximum is calculated based on a relative lateral position of an avoidance lateral position as a parameter with respect to a lateral position of the vehicle with respect to the road of the current point of time, a longitudinal speed of the driver's vehicle with respect to the road, and a lateral speed of the driver's vehicle with respect to a road. This calculation is led out by integration calculation based on the following formula from time series data O(t) of the direction of a vehicle body composite force, which is calculated based on three dimensional map from a longitudinal speed and a lateral speed which is normalized by being divided by the square root of a relative lateral position, the lateral position y(0) of the current point of time, a longitudinal speed vx(0), and a lateral speed vy(0).

[Formula 1]

$$v_x(t) = v_x(0) + \mu g \int_0^t \sin\theta(\tau)d\tau \quad (2)$$

$$v_y(t) = v_y(0) + \mu g \int_0^t \cos\theta(\tau)d\tau \quad (3)$$

$$x(t) = \int_0^t v_x(\tau)d\tau \quad (4)$$

$$y(t) = y(0) + \int_0^t v_y(\tau)d\tau \quad (5)$$

Wherein, μ represents a friction coefficient between a tire and a road surface, g represents of gravity, x(t) represents a longitudinal position at time t, and y(t) represents a lateral position at time t.

A plurality of the shortest avoidance trajectories using the avoidance lateral position as a parameter is calculated by the above formula. After the avoidance operation to the lateral position which is set as the parameter is completed, μ maximum straight braking (movement of braking while traveling straight in case in which a friction coefficient μ between a tire and a road surface is set maximum, i.e., μ utilization ratio is maximum) by θ=π, i.e., the maximum deceleration.

Figure 19:
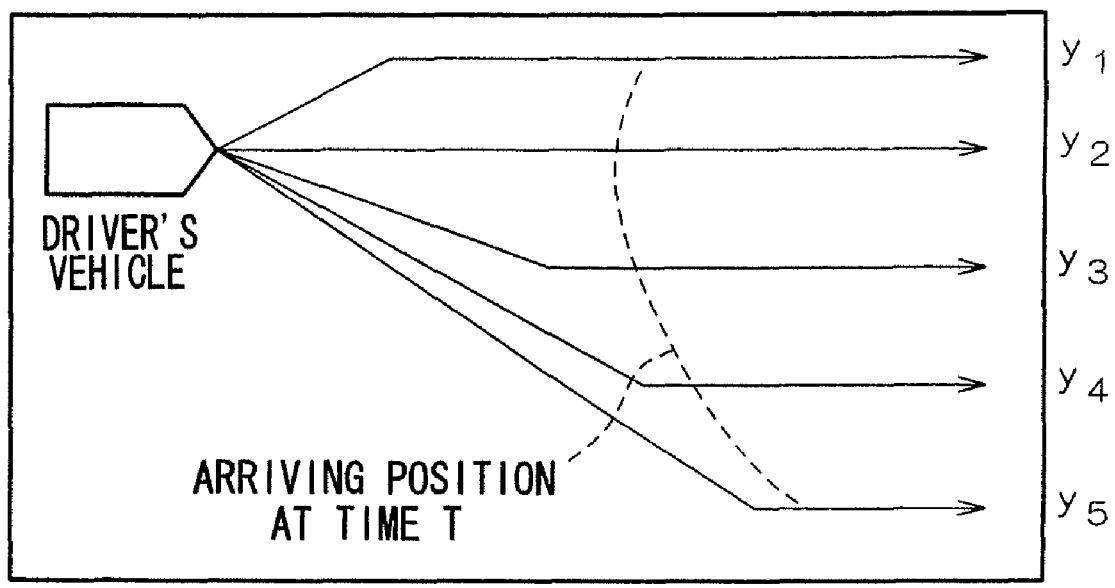
FIG. 19 is a diagram showing an example of a shortest avoidance trajectory when a lateral position of arriving driver's vehicle is used as a parameter.

FIG. 19 shows an example of the shortest avoidance trajectory in case in which lateral positions y1 to y5 of the arriving driver's vehicle are used as parameters. In the drawing, a broken curved line is connection between the arriving positions of the shortest avoidance trajectories after T seconds.

Figure 20:
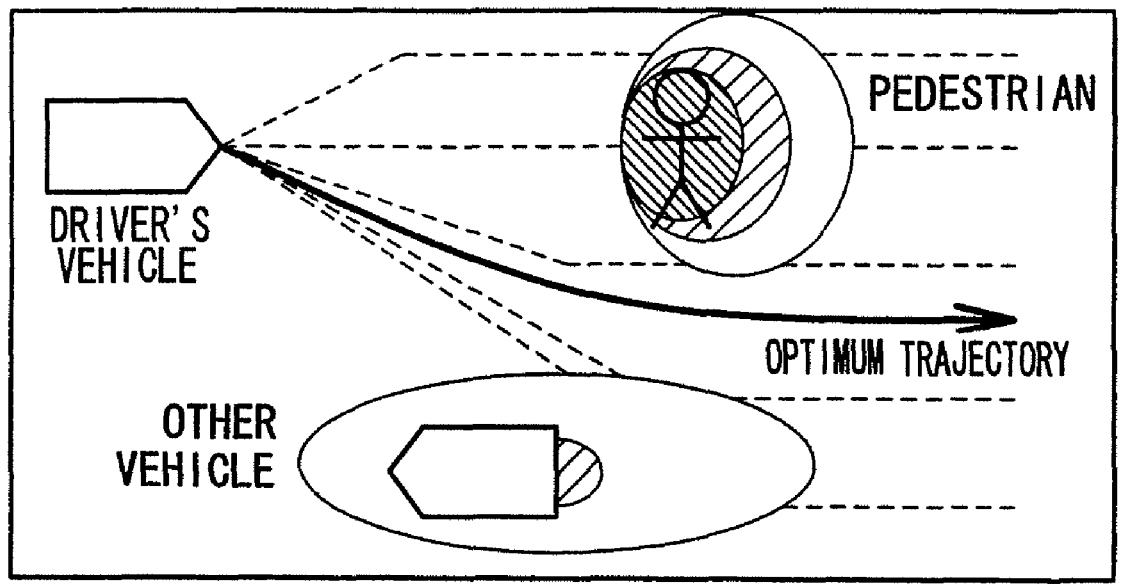
FIG. 20 is a diagram showing an example of a TTC risk map when the shortest avoidance trajectory is superposed.

At next step 110, a risk at passage time TTC when the driver's vehicle passes through the shortest avoidance trajectory is created as a TTC risk map (passage time risk map), based on the passage time TTC on the shortest avoidance trajectory obtained at step 108 and the future risk map created at step 106. The future risk map is expressed with a time function, thus the TTC risk map at the passage time can be created from the future risk map and the passage time TTC, and the passage time TTC is smaller, the risk becomes higher. FIG. 20 shows an example of the TTC risk map in case in which the shortest avoidance trajectory is superposed and displayed. For the TTC risk map, by weighting according to the passage time TTC, priority may be given to avoidance of an impending risk. In addition, it is also possible to give priority to avoidance of a high speed collision risk, by weighting according to the collision speed which is obtained from the optimum speed at the time of optimum avoidance control and the passing speed of an obstruction.

Herein, the TTC (time to collision) is the time when a predetermined point on the shortest avoidance trajectory in case in which the driver's vehicle carries out the shortest avoidance operation, and assuming that an obstruction exists on this point, it is the period of time until the driver's vehicle collides against this obstruction. In x(t) and y(t) in the formulas (4) and (5), t corresponds to TTC. Therefore, TTC risk at the coordinates x(t) and y(t) of the formulas (4) and (5) is a value at time t in the future risk map. Assuming that the relative distance from the driver's vehicle to the obstruction k is Dk, the relative speed of the obstruction k with respect to the driver's vehicle is Vk, and the variations of the relative distance and the relative speed are σ(Dk), σ(Vk), respectively, TTCk for the obstruction k is expressed by the following formula.

$$TTCk=(Dk-\sigma(Dk))/(Vk+\sigma(Vk)) \quad (6)$$

At next step 112, a lateral position, which is the parameter of the shortest avoidance which minimizes the risk of the shortest avoidance trajectory, on a road is obtained as the optimum trajectory based on the TTC risk map. At next step 114, it is determined whether it is possible to avoid the obstruction in the case of a traveling on the optimum trajectory, and if YES, the emergency avoidance control is carried out so as to travel on this trajectory in step 116.

The TTC risk, which is led out by using the lateral position as the parameter, on the shortest avoidance trajectory is described as a time function, and the maximum value of the TTC risk over the entire time is defined as a risk which is a parameter corresponding to the lateral position. The optimum avoidance trajectory is determined by obtaining the avoidance lateral position where the risk is minimized.

The selection of the avoidance lateral position may be carried out such that a lateral position which minimizes the maximum value of the TTC risk over the entire time is obtained from a preset plurality of candidates, or the avoidance lateral position may be lead based on the optimization method which uses the avoidance lateral position as continuous parameters.

After the optimum avoidance trajectory is determined, a relative lateral position between lateral position with respect to a current road of the driver's vehicle and the lateral position on the determined optimum avoidance trajectory is calculated, a normalized longitudinal speed and a normalized lateral speed which is normalized by square root of the calculated relative lateral position, with respect to a current road of the driver's vehicle are calculated, and a direction of a vehicle body composite force is calculated based on the normalized longitudinal speed and the normalized lateral speed three dimensional map.

Since this three dimensional map has different characteristics depending upon a friction coefficient μ between a tire and a road surface, a plurality of three dimensional maps are previously prepared, and the magnitude of a vehicle body composite force is obtained by interpolating values of the three dimensional maps.

Concerning the avoidance trajectory, steering operation forces and braking forces of front and rear wheels are totally controlled such that the maximum friction force is exhibited in the calculated direction of vehicle body composite force. This control can be realized by four-wheeled independent steering operation, and can be realized by a technique described in JP-A No. 2004-249971 for a braking operation and driving operation total control vehicle.

According to the shortest avoidance control of this example, when an avoiding operation is realized such that a yaw motion of a vehicle is not generated, a vehicle, which travels straight along a road, carries out an obstruction avoidance action while moving in parallel without changing the direction of the vehicle body. If yaw motion of the vehicle is not generated, i.e., if the yaw moment is set to 0, this means that the whole of the tire generating force is utilized for the vehicle body composite force, and the avoidance performance is exhibited at the maximum by utilizing a larger vehicle body composite force.

In the case of a vehicle of only a front wheel steering operation, which does not have rear wheel steering operation control function, and in the case of a vehicle in which action limit in an actuator is provided, since the maximum avoidance performance cannot be exhibited, it is necessary to carry out the shortest avoidance under such constraints, to create a TTC risk map under the constraints, and to carry out a further avoidance control. When a road has a curvature, it is possible to orient an attitude after avoidance operation into a traveling direction of the road by adding only the yaw motion for turning the vehicle body along the road.

Next, when a plurality of vehicles have the vehicle motion control devices of the example, i.e., when vehicle h4 traveling in the opposite lane has the vehicle motion control device, since both the vehicles detect the other vehicles as obstructions, both the vehicles can commonly use the risk map, and the optimum trajectory can be obtained by solving the optimization problem for multivariable while using an avoidance lateral position, which is a parameter in the shortest avoidance control of the plurality of vehicles, as parameter and while using a sum total of the risks concerning obstruction collisions of the plurality of vehicles as an evaluation function.

The optimization control problem of the plurality of vehicles is in the high degree of freedom of the problem and it is generally difficult to solve the problem, but in this example, as will be explained below, lowering the degree of freedom of the problem can be achieved and the optimum avoidance control of the plurality of vehicles is realized by using a scalar parameter, which is an avoidance lateral position, as a control variable for one vehicle.

Next, the optimization problem of the multivariable of the example will be explained. First, Assuming that μ maximization control (straight moving and braking) for maximizing the μ utilization ratio is carried out for other than the vehicle having the most impending risk, a position of an oncoming vehicle is predicted, and the optimum trajectory of the driver's vehicle is led out in the same way. The μ utilization ratio can be expressed with a rate between a target composite force, which is to be added to the vehicle body for obtaining a vehicle body action desired by a driver, and a critical composite force obtained from the size of the critical friction circle of each wheel.

Next, assuming that the driver's vehicle travels on an optimum trajectory, an optimum trajectory for a vehicle having the second-rated impending risk is led out. Then, assuming that the vehicle having the second-rated impending risk travels on this optimum trajectory, an optimum trajectory for a vehicle having the third-rated impending risk is led out, and the optimum trajectory is led out by optimization concerning all of the vehicles in this way.

After the optimization for all of the vehicles are carried out as described above, the optimization for the first vehicle is carried out again, and the optimization is repeated, thereby the convergence calculation is carried out.

Figure 21:
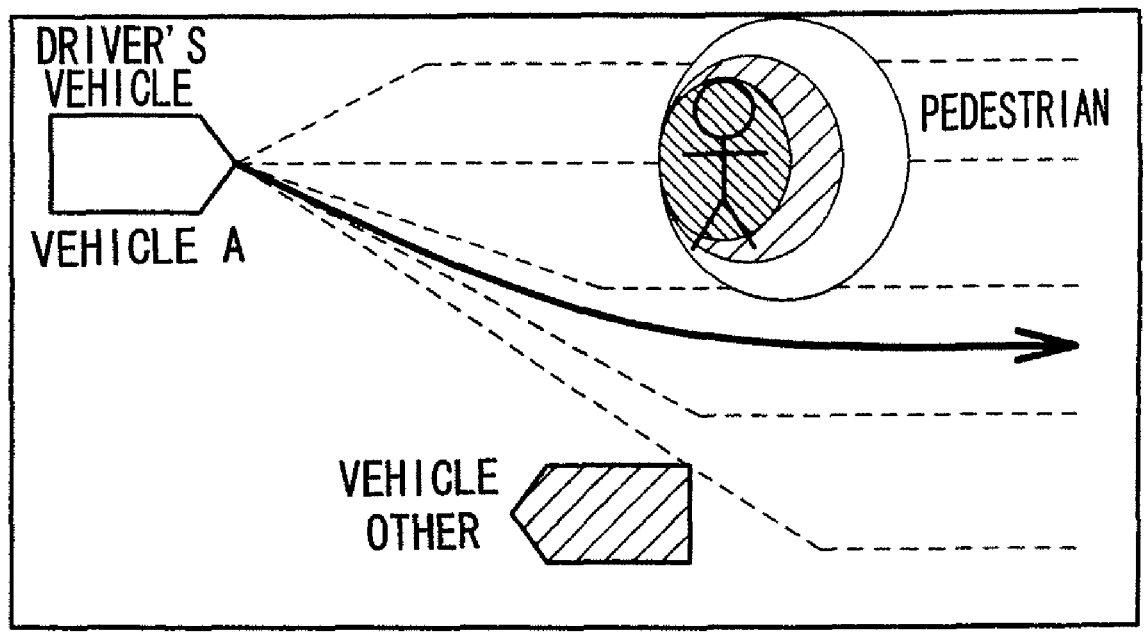
FIG. 21 is a diagram showing an example of a TTC risk map of a driver's vehicle (vehicle A) and the optimum trajectory.
Figure 22:
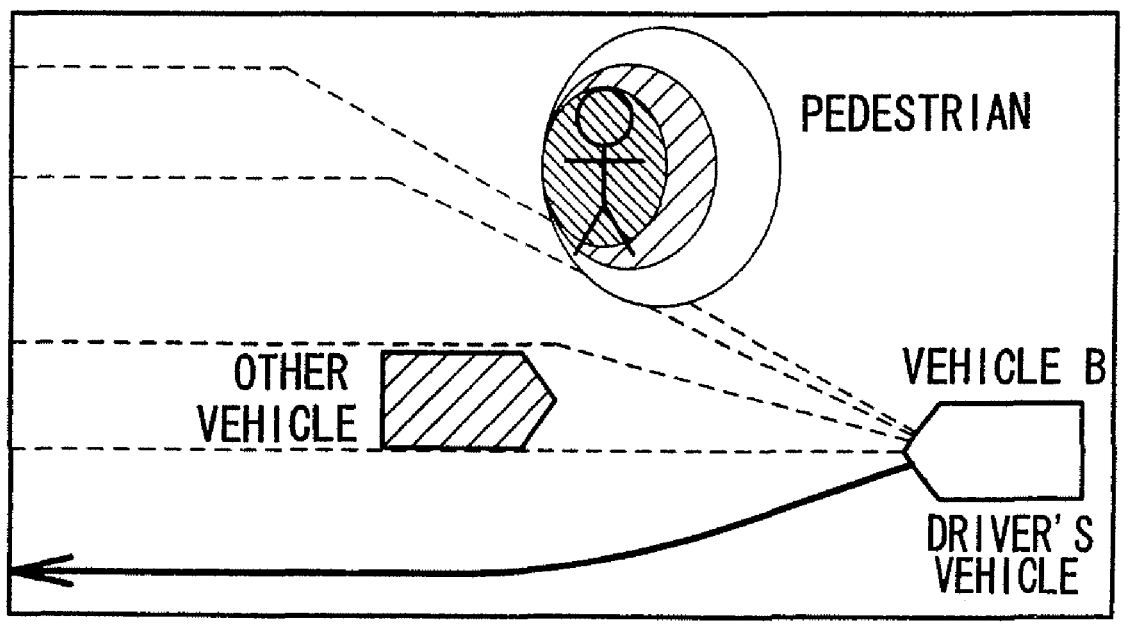
FIG. 22 is a diagram showing an example of a TTC risk map of a driver's vehicle (vehicle B) and the optimum restriction.

FIG. 21 shows an example of the TTC risk map and the optimum restriction of a driver's vehicle (vehicle A), and FIG. 22 shows an example of a TTC risk map and optimum restriction of a driver's vehicle (vehicle B).

When an optimum avoidance trajectory is to be calculated for a plurality of vehicles, the optimum avoidance trajectory is calculated for vehicles in the order of impending risk. In this case, if the most impending risks are generated for vehicles other than vehicles with the devices, it is assumed that vehicles other than the vehicle having the most impending risk carry out μ maximum straight braking which is the maximum deceleration. When the most impending risks are generated in vehicles with the devices, it is assumed that one of the vehicles having lower vehicle speed carries out the μ maximum straight braking.

When the optimum avoidance trajectory is to be calculated, since a future position of the vehicle, which carries out μ maximum straight braking, can precisely be estimated, a TTC risk, which is obtained by using these vehicles as obstructions, can be precisely expressed in a narrow region having the suppressed width. Therefore, an optimum avoidance trajectory, which is to be calculated first, of a vehicle having the highest impending risk, is calculated such that a safer solution is derived and it is possible to effect control more safely.

Next, an optimum avoidance trajectory for a vehicle having the second-highest impending risk is calculated. In this case, the optimum avoidance trajectory of the vehicle having the second-highest rated impending risk is calculated based on a case in which the vehicle having the highest impending risk carries out the optimum avoidance trajectory based on the assumption that vehicles having the second-highest and subsequent rated impending risks carry out the μ maximum straight braking, and vehicles having the third-highest and subsequent rated impending risks carry out the μ maximum straight braking. In this case, the second vehicle corrects the avoidance action to the optimum avoidance trajectory obtained by calculation from the μ maximum straight braking, and therefore it is possible to further improve safety.

Next, the same calculation as the above-described calculation is applied to the vehicles having third-rated and subsequent rated impending risk, and after the optimum avoidance trajectories for all of the vehicles are calculated, the optimization of the first vehicle is repeated, and therefore convergence calculation is carried out.

Although a technique for optimization for all of the vehicles in the order has been explained above, it is also possible to optimize the calculation in the following way. That is, assuming that all of the vehicles carry out the μ maximum straight braking at the maximum deceleration, the TTC risk is calculated. Next, an optimum avoidance trajectory for the vehicle having the highest TTC risk is calculated, and TTC risks for all of the vehicles are again calculated based on the calculated optimum avoidance trajectory. The optimum avoidance trajectory for the vehicle having the highest TTC risk is calculated, and this calculation is repeated.

Although the above explanation is based on an assumption that all of the vehicles carry out the μ maximum braking, the μ utilization ratio may be set for each of the vehicles in accordance with a risk. In this case, a vehicle having a low risk carries out loose braking, and the like, and therefore influence, which is given to a passenger of the vehicle having the low risk, can be reduced.

The three-dimensional map can always be renewed and an optimum avoidance trajectory can be led under the latest expectation by renewing the risk map frequently.

At next step 112, a lateral position, which is the shortest avoidance parameter for minimizing the risk on the avoidance trajectory, on a road is obtained based on the created TTC risk map, and the steering angle and the braking operation and driving operation forces are controlled in corporation by controlling the steering angle control device, the throttle opening degree control device, and the hydraulic brake pressure circuit.

For the shortest avoidance control, steering angles and braking forces of front and rear wheels are totally controlled such that the maximum friction force is exhibited in the calculated direction of the vehicle body composite force. This control can be realized by the four-wheeled independent steering operation. For the braking operation and driving operation totally controlling vehicle, the control can be realized by a technique described in JP-A No. 2004-249971.

Figure 23:
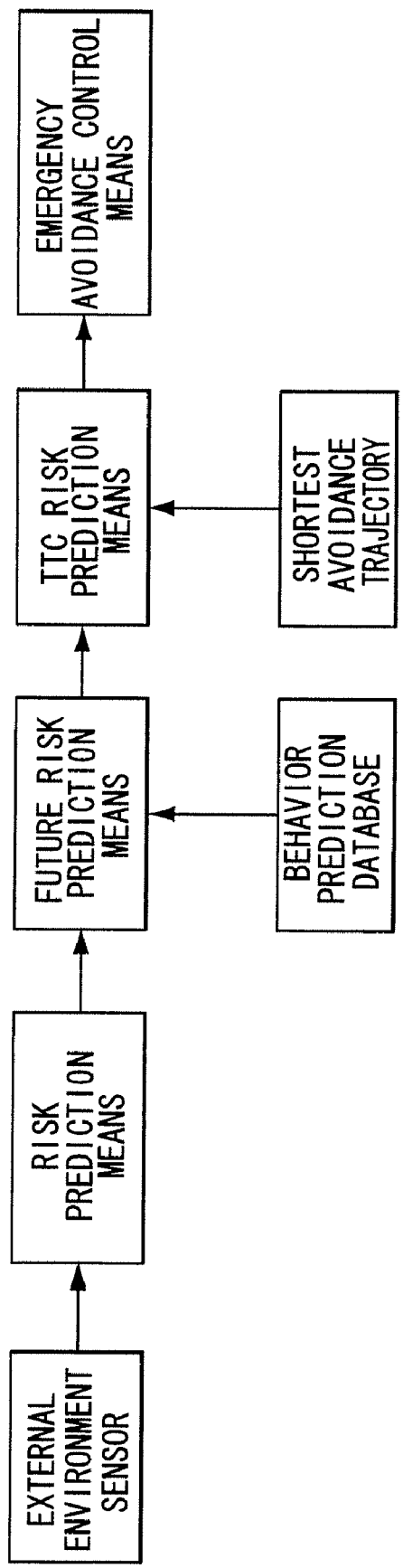
FIG. 23 is a function block diagram showing obstruction avoidance action control.

FIG. 23 is a function block diagram of the obstruction avoidance action control carried out by the control device which is described above. The external environment sensors such as the camera and the laser radar, and the like, are connected to risk estimation means which creates the current risk map. The risk estimation means is connected to future risk predicting means which creates a future risk map for predicting a future risk after T seconds based on the current risk shown on the current risk map and an probability of presence of an obstruction stored in the action prediction database.

There is provided shortest trajectory calculating means which calculates the shortest trajectory when the shortest avoidance control, which moves the lateral position, is carried out by using the lateral position on a road as parameter. The TTC risk predicting means creates a passage time risk map (TTC risk map) for predicting a risk at the passage time based on the passage time at which the driver's vehicle passes the shortest trajectory and the future risk map. Emergency avoidance control means estimates moving action to the lateral position, which minimizes a risk on the shortest trajectory, on a road as avoidance action, based on the passage time risk map, and controls the driver's vehicle such that the estimated avoidance action is carried out. Concerning execution of the estimated avoidance action, the predicted action can be carried out when the risk of the estimated avoidance action exceeds a predetermined value and it becomes danger. Even if the risk of the estimated avoidance action does not exceed the predetermined value, when a driver carries out the steering operation to avoid risk, the estimated avoidance action can be carried out. When the risk of the estimated avoidance action does not exceed the predetermined value, the estimated avoidance action may be carried out using the steering operation of a driver as a trigger.

[Damage Minimization Action Control]

At step 114, if it is determined that an obstruction cannot be avoided, collision damage of each of shortest avoidance trajectories is estimated and action of the vehicle is controlled such that the damage is minimized at step 118. The damage minimization action control will be explained below.

Figure 24:
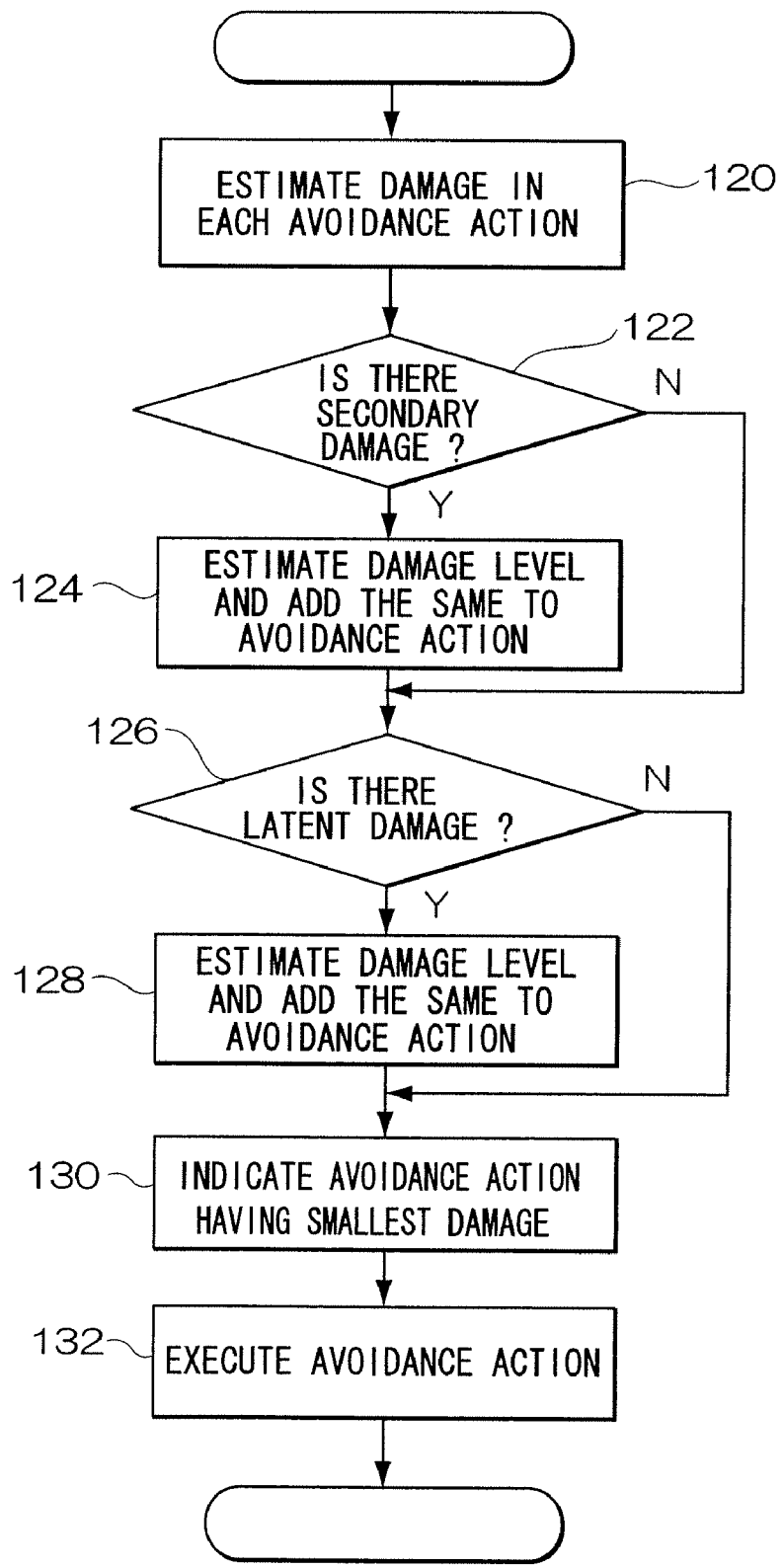
FIG. 24 is a flowchart showing details of damage minimization action control.

Details of the damage minimization action control at step 118 will be explained below with reference to FIG. 24. At step 120, a damage level is estimated in accordance with the following formula for each of avoidance actions which are determined at step 114 that they cannot avoid an obstruction.

$$\text{Damage level} = \text{magnitude of damage} \times \text{probability} \times \text{correction value} \quad (7)$$

Example of the avoidance action are avoidance action only by control of a steering angle, avoidance action only by braking (deceleration), avoidance action by braking and control of a steering angle, avoidance action only by acceleration, and avoidance action by acceleration and control of a steering angle, and the like.

Magnitude of damage is previously determined while taking, into account, whether primary damage or secondary damage (damage related to an obstruction other than obstruction opposed to the driver's vehicle), whether damage of the driver's vehicle or damage of oneself, whether damage of collided object or damage of collided person, types of obstruction (e.g., pedestrian, expensive facility on the side of a road, size and mass of obstruction), location of collided portion, and height of effect of protecting tool against collision, and the like. The magnitude of the primary damage is estimated at step 120.

Magnitude of damage caused by difference in the collided portion will be explained. As shown in FIG. 25(1), there are the case of a full lap in which a lapping amount at the time of collision to an obstruction is 100%, and the case of a half lap in which the lapping amount at the time of collision to the obstruction is 50%. A damage level of the case of the full lap is larger than that of the case of the half lap. In the case of the half lap, as shown in FIG. 25(3), the driver's vehicle changes its attitude from the position of the first contact with the obstruction, and it is expected that secondary damage be generated. Therefore, secondary damage, which is generated depending upon a difference in collided portion, is estimated.

The probability of occurrence of collision is determined while taking, into account, action expectation precision, safety of avoidance space (probability of occurrence of secondary damage), dead angle and probability of entering possibility.

The correction value is determined while taking, into account, cost of the avoidance action, difference with respect to a driver's will, and control performance of the driver's vehicle to an avoiding road, and the like.

At next step 122, it is determined whether there is a possibility of secondary damage, and when there is a possibility of secondary damage, at step 124, the damage level is calculated in accordance with the formula (7), and calculated the damage level is added to the damage level obtained at step 120.

At next step 126, it is determined whether there is a dead angle, which cannot be detected by the group of sensors, and whether there is an entering-possible region, thereby determining whether there is a possibility that a latent obstruction exists.

When there is a possibility that a latent obstruction exists, at step 128, a damage level is calculated by using the probability of presence of the latent obstruction as a probability and by using the formula (7) for a latent obstruction such as an obstruction which may exists in a dead angle and an obstruction which may enter from the entering-possible region, and the like, a result of the calculation is added to the damage level obtained at steps 120 and 124, and a final damage level is calculated.

At next step 130, damage levels of avoidance actions are compared with each other, avoidance action having smallest damage level is selected, and at step 132, at least one of the steering angle control device, the throttle opening degree control device and the hydraulic brake pressure circuit is controlled such that the avoidance action having the smallest damage level is indicated for a driver, or the avoidance action having the smallest damage level is realized.

When it is determined that the avoidance action having the smallest damage level is operation of the pedestrian protection device 40, the inflator of the pedestrian protection device 40 is operated and the air bag element is developed as shown in FIGS. 4 to 6. Thereby, the pedestrian controller pushes out a pedestrian in the lateral direction of the vehicle, and the pedestrian is prevented from being bounced onto a hood by controlling the behavior of the pedestrian at the time of collision, and therefore it is possible to prevent the pedestrian from falling onto a road surface from a high position.

The control of the pedestrian behavior is executed only when it is determined that the damage level is minimized by operating the pedestrian protection device 40, and therefore, it is possible to reliably control the pedestrian behavior. The control of the pedestrian behavior is carried out such that particular collision between a road surface and a head in the collision between the pedestrian and the road surface after the collision is avoided, and therefore, the probability that a pedestrian is seriously injured can be lowered. When the pedestrian behavior is controlled by the pedestrian protection device, a pedestrian is not bounced onto a hood and is pushed in the lateral direction and is moved to the side of the vehicle, and the pedestrian comes into contact with the road surface from his or her back, and therefore an impact force applied to the head of the pedestrian can be alleviated.

According to analysis of accident investigations, if the collision speed exceeds 40 km/h, the degree of serious injury to pedestrians is increased. According to experiments performed by the inventors and the like, the control of the pedestrian behavior using the pedestrian protection device also has an effect of preventing a pedestrian from being bounced when the collision speed is 40 km/h, in addition to a case in which the collision speed is 25 km/h.

The age, the gender, whether the pedestrian has belongings, and a direction of the line of sight are used as the attributes of a pedestrian in the above explanation, but at least one of a direction of a face, attitude and action may be added to the attributes. In this example, a probability model of accident avoidance action of a pedestrian is further added to the pedestrian action prediction model, and the risk may be corrected. In the above explanation, automatic steering operation, automatic braking and automatic driving are totally controlled based on the estimated risk, and an obstruction is avoided. A selection range of a traveling avoidance trajectory of the driver's vehicle to avoid an obstruction may be enlarged, and a sense of disharmony of an interposition into a driver's operation may be alleviated.

Hereinabove, an example in which when it is difficult to avoid, the control is performed such that the driver's vehicle collides so as to minimize the damage has been described, but in this case, it is preferable avoid damage, generated due to obstruction avoidance, caused by a difference of a physique of a pedestrian.

During the automatic steering operation, the fact that the automatic steering operation is being carried out may be informed to the driver by giving vibration to the steering angle for micro feedback of the steering angle. During the automatic steering operation, fact that the automatic control operation is being carried out may be informed by giving mechanical vibration to the seat surface.

During the automatic steering operation, to prevent peripheral vehicles from being secondarily damaged, when the automatic steering operation avoidance and automatic braking avoidance (straight braking) are carried out, a hazard lamp may be lit (for rearward vehicle), a headlight high beam may be lit (for forward vehicle) and a klaxon may blow at the same time when the driver is informed of the above fact or independently when the driver is informed of the above fact.

When an obstruction is a pedestrian, a passage time risk map indicative of a risk at the passage time at which the driver's vehicle passes is created based on the passage time at which the driver's vehicle passes through a trajectory on which avoidance action is not carried out and based on the future risk map, and when the future risk on the basis of the passage time risk map at the time at which the pedestrian passes is equal to or higher than a predetermined value, shift down control may be carried out so as to increase a number of revolution of an engine of the driver's vehicle without changing the speed of the driver's vehicle. By automatically shifting down, the number of revolution of an engine is increased, and a pedestrian can be informed of existence of the driver's vehicle. The control for increasing the engine sound is stopped when the future risk becomes less than the predetermined value or when the driver's vehicle passes the pedestrian.

The level of the shifting down is selected such that the engine sound level expected from the speed of the driver's vehicle and the selected gear position becomes larger than the noise level of the traveling environment by a predetermined value or more.

If the expectation precision of the risk is improved by detecting a line of sight of a pedestrian and correcting the future risk map, unnecessary engine sound increasing control can be avoided.

When time zone of driving is night, instead of increasing the engine sound, in combination of increase in engine sound, the pedestrian may be irradiated with light having significantly high brightness with respect to brightness of a headlight of the driver's vehicle, or the pedestrian may be irradiated with spot light having a different color from that of the headlight.

This control is carried out when the obstruction is recognized as a pedestrian in this explanation, but this control may also be applied to the case in which a dead angle region of the environment map exists and it is determined that a possibility of a new obstruction appearing from the dead angle region is a pedestrian is high.

Figure 26:
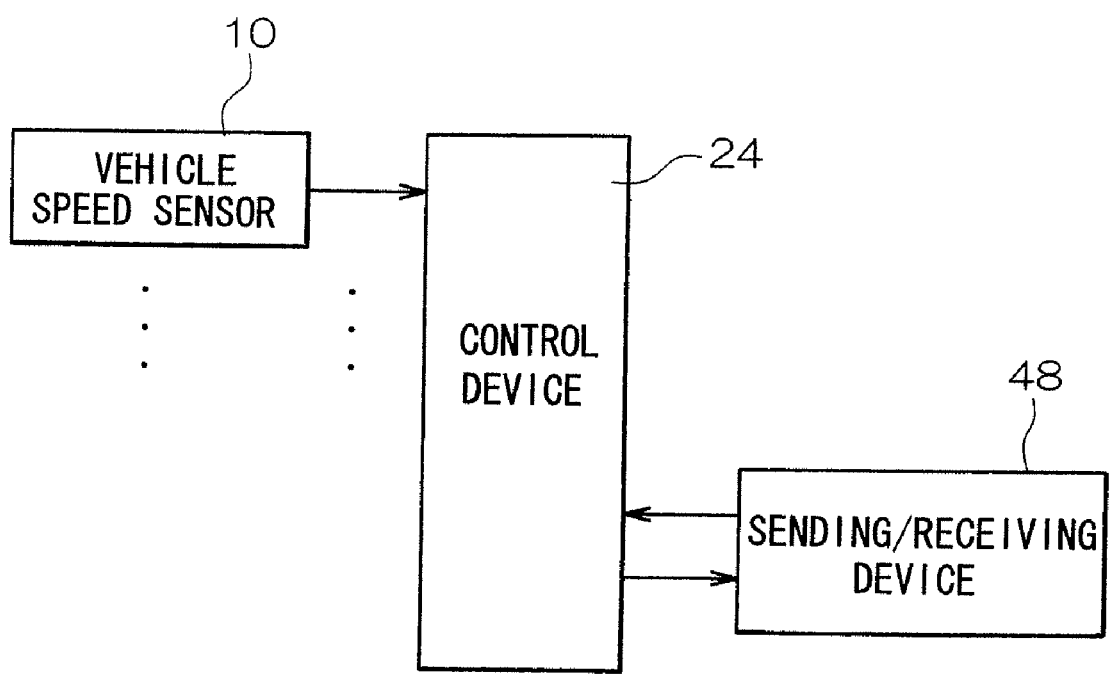
FIG. 26 is a block diagram showing another example of a vehicle motion control device of the example (second example)

Hereinabove, an example in which by using the group of sensors mounted on the vehicle as the external environment detection means for detecting the external environment state, other vehicle is extracted has bee described, but alternatively, a sending/receiving device 48 as information sending device which sends information of the driver's vehicle to peripheral vehicles, and the like, and receives information sent from the peripheral vehicle, and the like, may be connected to the control device 24 shown in FIG. 1, and other vehicle which is an obstruction may be extracted by the control device 24 based on the received information as shown in FIG. 26. Since a structure other than the sending/receiving device shown in FIG. 26 is the same as that shown in FIG. 1, only the vehicle speed sensor shown in FIG. 1 is shown in FIG. 26, and other group of sensors is omitted from the drawing.

In this case, each vehicle sends information indicating the position and the speed (speed vector of the driver's vehicle) of the driver's vehicle, and information indicating the weight and size of the driver's vehicle from the sending/receiving device 48 as driver's vehicle information, and each vehicle also receives the same information from the other vehicle by the sending/receiving device 48. Each vehicle may send only information indicative of position and speed vector of the driver's vehicle without sending the driver's vehicle information including information indicative of the weight and size of the vehicle.

The position of the driver's vehicle can be estimated based on at least one of a position of the driver's vehicle detected by the GPS and road map information obtained from communication between vehicles on a road with respect to the environment group of sensors provided on the side of the road, and information indicative of the speed vector of the driver's vehicle can be estimated based on the speed vector of the driver's vehicle detected by the vehicle speed sensor or based on the wheel speed, longitudinal acceleration and yaw angle speed.

The detection of the position of the driver's vehicle and the speed vector of the driver's vehicle by the information communication can be carried out inexpensively and precisely as compared with a case in which the position and the speed vector of the peripheral vehicle are detected using the group of sensors, and information of other vehicle, as an obstruction, can be obtain by the mutual communication of the position and the speed vector of the driver's vehicle with the peripheral vehicle, and thus, the automatic emergency avoidance control can efficiently be realized.

The speed vector of the driver's vehicle includes information of speed and the moving direction of the vehicle, and if information indicative of speed (scalar amount) and the moving direction of the vehicle is included in the driver's vehicle information, not only the current risk map but also the future risk map and the passage time risk map can easily be created.

By obtaining road map information obtained from the communication between vehicles and a road, the latest map can always be utilized, and further if the communication between vehicles and a road is used, since a memory device for storing the map and a monitor for displaying the map need not be mounted on the vehicle, the vehicle motion control device of the example can inexpensively be constituted as compared with a case in which the GPS is mounted in the vehicle and the road map information is obtained by a GPS signal.

It is preferable that an information sending device which sends information of the driver's vehicle is mounted also in a vehicle which does not have the above-explained vehicle motion control device of the example. If the vehicle has this information sending device, the vehicle having the vehicle motion control device of the example can recognize a vehicle having the information sending device as an obstruction. The information sending device only sends information, and does not give information to the driver, does not give an alarm to the driver or does not intervene and thus, resistance for mounting the information sending device to all vehicles is low.

When a sensor for detecting a magnetic marker provided on a road is connected to the control device in addition to road map information obtained from the communication between vehicles and a road, the precision of the position detection can further be improved. The magnetic markers may be disposed at appropriate intervals such as at every intersection, and the like, and this interval is determined by trade off between cost of the magnetic marker and the precision of the position detection of the driver's vehicle. Information may also be obtained by utilizing radio communication in a local area instead of the magnetic marker.

When acceleration information of the driver's vehicle is added to the driver's vehicle information to be sent, since it is possible to precisely expect a future position of a peripheral vehicle as an obstruction, creating precision of the passage time risk map can be improved, precision of the automatic emergency avoidance can be improved, and safety can be improved.

For a conventional technique related to the information sending device, there is a known technique described in JP-A No. H11-195196. According to this technique, a position of a driver's vehicle is detected, information including at least position information of the driver's vehicle is sent to a peripheral vehicle, and various information is alarm and given to the driver based on the driver's vehicle information and the received information of the peripheral vehicle.

According to this conventional technique, however, since speed vector of the driver's vehicle is not sent, it is difficult to create the future risk map and the TTC risk map of the example only from the information of the conventional technique.

In this example, attention is paid to the fact that it is absolutely necessary to obtain a position and a speed vector of a peripheral vehicle for creating the future risk map and the passage time risk map, the speed vector of the driver's vehicle is detected and this is sent to the peripheral vehicle as information and thus, it is possible to precisely create the future risk map and the passage time risk map.

In this example, positions and the speed vectors of the driver's vehicle are exchanged with each other through communication, thereby obtaining information of the positions and speed vectors of the peripheral vehicles, and therefore, information of a vehicle which affects traveling of the driver's vehicle can be given to a driver by means of voice or image, or the like, using the obtained information.

For example, in the case of a turning to the right, a straight traveling vehicle behind an opposed vehicle which turns to the right, and the like, is extracted from the peripheral vehicle and this information is displayed on a screen of a navigation system or by means of voice for evocation of caution, and safety can be improved and driving burden can be reduced.

The passage time risk map is created from information of the position and the speed vector of the peripheral vehicle, obtained by communicating the position and speed vector information of the vehicle with the peripheral vehicle each other, and a driver can be informed of the avoidance operation carried out in accordance with the passage time risk map by means of alarm, or the like.

Under the situation in which the control device determines that the automatic avoidance operation is necessary based on the passage time risk map, when the driver's vehicle is being stopped, or when the avoidance action cannot be expected, i.e., when the speed of the driver's vehicle is 0, or when there is no avoidance space (there is a wall, or the like, on the side of the vehicle for example), or when it is difficult to predicate the action of other vehicle, the yaw angle of the vehicle is controlled in accordance with the obtained position and the obtained speed vector of the other vehicle, and therefore the attitude of the driver's vehicle can be controlled such that an attitude which is strong against an impact (impact alleviating yaw angle control) is maintained.

The yaw angle of the vehicle can be controlled by controlling the steering angle of four wheels in a case in which the vehicle stops, and by controlling the steering angle of the four wheels and the braking operation and the driving operation in a case in which the vehicle travels. In this case, the yaw angle of the vehicle is controlled so as to be such an angle that collision damage is minimized.

For control in a case in which the vehicle is stopping, the situation in which a driver's vehicle 50 is stopping at an intersection and other vehicle 52 which turns to the left is colliding with the vehicle 50 from a diagonal direction as shown in FIG. 27 will be explained. In such a situation, when diagonal collision is expected based on a position and a speed vector of the other vehicle 52, which turns to the left from right side, and an expected road surface μ while the driver's vehicle stops, and a risk of a right front portion of the driver's vehicle on the passage time risk map is equal to or higher than a threshold value and it is determined that an impact alleviating control is necessary, the steering angle of the four wheels is controlled such that the diagonal collision is avoided, and the yaw angle of the vehicle is changed to a direction of a collision vehicle such that an attitude of the vehicle for minimizing the risk is obtained.

Thereby, the yaw angle of the driver's vehicle is controlled such that a traveling direction of the driver's vehicle and a traveling direction of the other vehicle which is colliding with the driver's vehicle are positioned on one straight line, and the direction in which the driver's vehicle travels is changed, and therefore, an accident by diagonal collision can be changed into an accident of head-on collision having excellent impact absorbing properties, and safety can be improved.

When the driver's vehicle is traveling (vehicle speed≠0) and there is an avoidance space, the avoidance operation is carried out as explained in the example. In this case, the yaw angle is oriented in a direction which is in parallel to a road on which the driver's vehicle is traveling such that the avoiding operation can be carried out the most efficiently and the tire generating force of each tire can be utilized for the avoidance operation to the maximum.

However, Under the situation in which collision cannot be avoided even if the optimum avoidance control is carried out, i.e., the situation in which collision damage is generated, it is preferable that the impact alleviating yaw angle control described above, which the yaw angle of the vehicle is controlled such that an attitude of the vehicle to minimize the collision damage, i.e., an attitude of the vehicle which minimizes the collision damage can be obtained to alleviate the impact, is carried out at the same time as the optimum avoidance control.

The avoidance control and the impact alleviating yaw angle control utilize the tire generating force. Therefore, if the impact alleviating yaw angle control is carried out, the performance of the avoidance control is lowered, and the speed at the time of collision is increased in some cases.

Therefore, a weight function indicating that what priority is given to one of the impact alleviating yaw angle control and the avoidance control is introduced, a weight function which minimizes the impact when an accident is generated, i.e., a weight function which minimizes the collision damage is obtained in accordance with a situation, and the impact alleviating yaw angle control and the avoidance control are carried out based on the weight function.

[Another Example of Pedestrian Protection Device]

The example in which it is difficult to avoid an obstruction and the pedestrian protection device is used when the obstruction is a pedestrian has been explained above. A case for protecting a passenger (two-wheeler passenger) of a two-wheeler passenger when the obstruction is a bicycle, a motorbike, an automatic two-wheeler (simply, two-wheeler, herein after in some cases) will be explained.

Examples of conventional techniques relating to protection of a passenger of a bicycle and a two-wheeler are JP-A Nos. 5-182097, 6-72284, 2002-513351, 2003-226211, 2003-346297, 2003-291758, and 2005-41391.

According to traffic accident statistics, in traffic accident fatalities, a rate of fatalities of accident in vehicles such as a bicycle, a motorbike and an automatic two-wheeler is about 30% which is second highest next to accident in a car and during walking. Collisions between a two-wheeler and a vehicle can be roughly divided into four types as shown in FIG. 29, i.e., vehicle collision against a side of the two-wheeler (side collision of two-wheeler), two-wheeler collision against a side of the vehicle (side collision of vehicle), collision of a front surface of the two-wheeler against the vehicle (front collision of two-wheeler), and vehicle collision against a rear portion of the two-wheeler (rear collision of two-wheeler).

As shown with collision type in FIG. 29A, with respect to the collision behavior of a passenger of a two-wheeler that is often seen in a sudden accident when a vehicle collides against a side of a two-wheeler, it has been confirmed that the passenger of the two-wheeler is bounced onto the hood (bonnet), or collides against a window shield, the roof, an A pillar or the like, of the vehicle.

In the collision types shown in FIG. 29B to FIG. 29D also, it is confirmed that a passenger is bounced onto a hood or a trunk at the time of collision. Most of passengers, which bounced up, collide against the vehicle and fall onto a road surface. Many passengers are injured by collision against the road surface. After a pedestrian falls, the pedestrian is run over by a subsequent car and injured in some cases. Like the protection of a pedestrian, in order to reduce damage of a passenger of a two-wheeler, it is necessary to prevent the two-wheeler passenger from being bounced onto a vehicle and to prevent the passenger from being run over by a vehicle. Like the pedestrian collision behavior control in the pedestrian protection device explained above, it is conceived effective to control the collision behavior of the two-wheeler passenger and to prevent the passenger from being bounced onto a vehicle.

However, at the time of collision of the two-wheeler, the two-wheeler passenger is sandwiched between the two-wheeler and a vehicle as described above, and it is not easy to control the collision behavior of a passenger.

A pedestrian may be injured when he or she is sandwiched between a two-wheeler and a vehicle in some cases. Thus, when the collision behavior of the two-wheeler passenger is controlled, it is necessary to control the behavior while taking the collision behavior of the two-wheeler into account also.

The inventors paid attention to an experiment result that a two-wheeler and a two-wheeler passenger are separated after collision and they show different collision behaviors, and the inventors came to the conclusion that in order to solve the above problem, it is necessary to control the collision behaviors of the two-wheeler and the passenger independently. This is because that the inventor considered that connection between the two-wheeler and the passenger is not strong and they can easily be separated from each other. In order to separate the two-wheeler and the passenger after collision and to protect the two-wheeler passenger, it is necessary to dispose a two-wheeler collision behavior control element and a two-wheeler passenger protection device or an air bag element for passenger collision behavior protection. If the two-wheeler collision behavior control element and the two-wheeler passenger protection device or the air bag element for passenger collision behavior protection are separately disposed in this way, it is possible to prevent a two-wheeler passenger from being sandwiched between the two-wheeler and a vehicle, and to control the collision behavior of the passenger.

In order to protect the two-wheeler passenger, as shown in FIG. 28, the control device 24 shown in FIG. 1 is provided with a contact portion disposed at a portion of a front surface of the vehicle body, and a two-wheeler passenger protection device 41, which controls behavior of the two-wheeler passenger by pushing the two-wheeler passenger separated from the two-wheeler by the contact portion, is connected to the control device 24. The two-wheeler passenger protection device 41 pushes the two-wheeler passenger to the lateral direction by the contact portion such that the two-wheeler passenger separated from the two-wheeler is not bounced onto a hood of the vehicle body, and controls the behavior of the two-wheeler passenger such that the two-wheeler passenger is moved sideway of the vehicle.

A two-wheeler collision behavior control device 54 is connected to the control device 24. The two-wheeler collision behavior control device 54 pushes wheels of a two-wheeler near a road surface such that the two-wheeler and a two-wheeler passenger are separated from each other, and controls the collision behavior of the two-wheeler such that the two-wheeler passenger is separated from the two-wheeler. According to the two-wheeler collision behavior control device 54, the two-wheeler passenger is separated from the two-wheeler, and the behavior of the two-wheeler is controlled such that the passenger is not bounced onto the hood of the vehicle and the passenger is moved forward of the vehicle in a low attitude.

The two-wheeler passenger protection device 41 comprises an air bag element having a contact portion and an inflator for supplying gas and developing the air bag element like the above-explained pedestrian protection device. The air bag element is folded and accommodated in the bumper of the vehicle, and the inflator of the two-wheeler passenger protection device 41 is connected to the control device.

Concerning the two-wheeler collision behavior control device 54 and the two-wheeler passenger protection device 41, a function of the pedestrian protection device 40 may be included in the two-wheeler passenger protection device 41, or the function of the two-wheeler passenger protection device 41 may be included in the pedestrian protection device 40, and this may be disposed together with the two-wheeler collision behavior control device 54, but this can also be provided together with the above-explained pedestrian protection device 40. A structure other than the two-wheeler collision behavior control device and the two-wheeler passenger protection device shown in FIG. 28 is the same as that shown FIG. 1 or the structure of the first example, and therefore, only the vehicle speed sensor in FIG. 1 is illustrated in FIG. 28, and other group of sensors is omitted in the drawing.

The two-wheeler collision behavior control device includes the two-wheeler collision behavior control element, and a driving device of the inflator, and the like, which is driven so as to move a tip end of the two-wheeler collision behavior control element in a direction of a wheel of the two-wheeler. The two-wheeler collision behavior control element can be constituted using an air bag element 56 whose developed state is shown in FIG. 31A or a two-wheeler pushing device 64 shown in FIG. 31B and FIG. 31C.

Figure 31A:
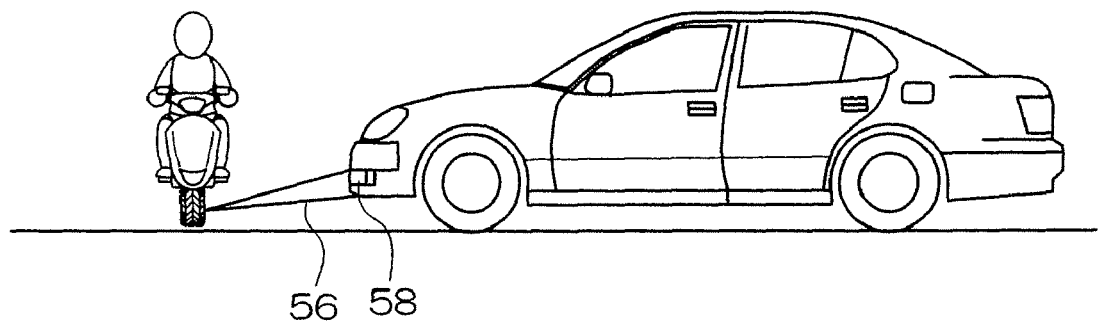
FIG. 31A is a schematic diagram showing an example of a two-wheeler collision behavior control element.

Concerning the air bag element 56 shown in FIG. 31A, a two-wheeler contact portion which comes into contact with the two-wheeler is created at its tip end of the air bag element 56, and the air bag element 56 is folded and accommodated in a lower portion of a bumper 58 of the vehicle. An inflator for supplying gas to the air bag element 56 is connected to the air bag element 56. If the inflator is operated and gas is supplied to the air bag element, the air bag element 56 is expanded and developed, and in this expanded and developed state, as shown in FIG. 31A, the wheel of the two-wheeler near the road surface is pushed by the two-wheeler contact portion created on the tip end of the air bag element 56. Thereby, the two-wheeler passenger is separated from the two-wheeler.

Figure 31B:
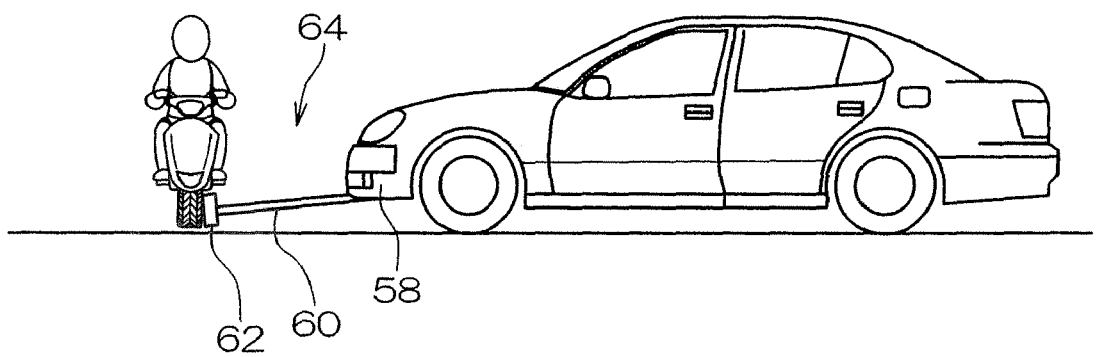
FIG. 31B is a schematic diagram showing an example of a two-wheeler collision behavior control element.
Figure 31C:
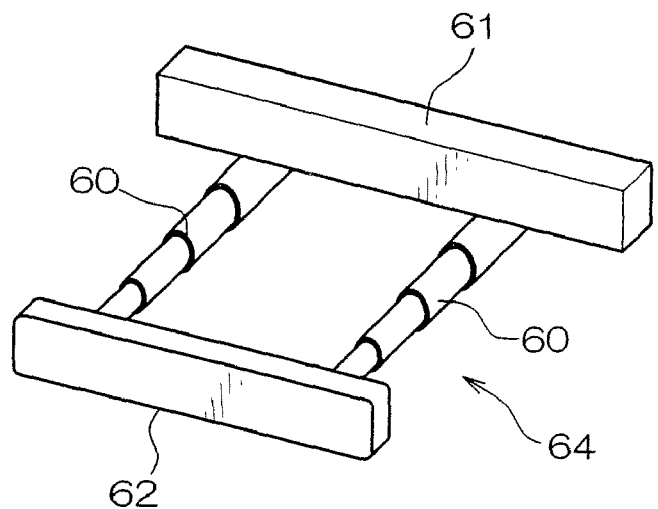
FIG. 31C is a schematic diagram showing an example of a two-wheeler collision behavior control element.

A two-wheeler pushing device 64 shown in FIG. 31B and FIG. 31C includes a pair of expansion rods 60 functioning as pushing portions, a drive system 61 disposed in a lower portion of the bumper 58 of the vehicle for expanding and shrinking the pair of expansion rods 60, and a plate-shaped two-wheeler contact portion 62 connected to the tip ends of the pair of expansion rods 60. According to the two-wheeler pushing device 64, the two-wheeler contact portion projects and the wheel of the two-wheeler near a road surface is pushed by driving the drive system 61 and expanding the pair of expansion rods 60. The angle of the two-wheeler contact portion can be adjusted by controlling the expansion amount of each of the expansion rods 60.

A cylinder which expands and shrinks by air pressure or hydraulic pressure can be used as the pushing portion for pushing out the two-wheeler contact portion instead of the expansion rod. The pushing portion can be constituted such that a resilience of elastic force of a deformed spring or force of a shape-memory metal is utilized, and the two-wheeler contact portion can be pushed. The two-wheeler contact portion 62 can be constituted by winding or adhering a cloth around or on a thin steel plate or a resin plate.

Although the two-wheeler contact portion and the pushing portion are connected in the above explanation, the two-wheeler contact portion may be separated from a vehicle wheel using air pressure, hydraulic pressure or elastic force, and the two-wheeler contact portion may shoot toward the wheel side of the two-wheeler from a front portion of the vehicle.

The two-wheeler collision behavior control element can be disposed on an upper portion of the bumper or in the bumper instead of the above-explained lower portion of the bumper. The two-wheeler collision behavior control element may also be disposed on a front grill or a front end of a bonnet, and may also be disposed on a portion of a headlight or a direction indicator.

According to the two-wheeler collision behavior control element, the sensor disposed on the vehicle detects that a two-wheeler approaches, and if it is determined that it is difficult to avoid collision due to relative speed difference of both of them obtained in the above-explained way, the two-wheeler collision behavior control element is pushed out. Thereby, the two-wheeler contact portion of the two-wheeler collision behavior control element comes into contact with the two-wheeler at the time of collision so as to separate the two-wheeler and the two-wheeler passenger from each other, and the collision behavior of the two-wheeler is controlled. At the same time, the two-wheeler passenger protection device 41 is controlled and the collision behavior is controlled such that the two-wheeler passenger moves sideway of the vehicle. By separating the two-wheeler from the passenger and controlling the collision behavior of the two-wheeler in this manner, it is possible to prevent the two-wheeler passenger from being sandwiched between the two-wheeler and the vehicle.

If an air bag element for protecting the two-wheeler passenger is further provided on a front hood of the vehicle, it is possible to reduce the impact of the two-wheeler passenger at the time of collision and to protect the two-wheeler passenger when the two-wheeler passenger moves toward the hood of the vehicle.

A study result of two-wheeler collision behavior control and the passenger collision behavior control, which were carried out for showing effectiveness of the example using a two-wheeler simulation model shown in FIG. 30, is shown. A case in which the air bag element is used as the two-wheeler collision behavior control element will be explained below.

In the case of the two-wheeler collision behavior control element, since barycenter positions of the pedestrian and the two-wheeler are different, a position in the height direction from a road surface at which the air bag element is developed is different. That is, in the case of a pedestrian, a developing position in the height direction of the air bag element is set after the schematic barycenter position is estimated based on the height of the pedestrian, but in the case of the two-wheeler, a position of a saddle of the two-wheeler or a diameter of a tire of the two-wheeler are used as an schematic calculation reference. This is because that since a two-wheeler passenger drives in a state in which the passenger sits on the saddle as shown in FIG. 30, a barycenter position of the passenger is also above the saddle. Therefore, the saddle position of the two-wheeler is measured by a sensor of the external environment detection means or a tire diameter is measured and the saddle height is estimated and then, the developing height direction and position of the air bag element are determined.

Although the connection between the two-wheeler and the passenger is not strong, the behavior of the two-wheeler passenger at the time of collision is influenced by two-wheeler behavior. Thus, the developing direction, the developing force and the developing timing, and the like, are adjusted based on the estimated collision angle between the vehicle and the two-wheeler, and collision speed, and the like, the two-wheeler passenger is pushed by the two-wheeler passenger protection device, and therefore, the air bag element of the two-wheeler collision behavior control element is developed and the two-wheeler is pushed such that the two-wheeler passenger can move sideway of the vehicle.

Next, two-wheeler collision behavior control will be explained. There are a plurality of collision types between the two-wheeler and the vehicle as shown in FIG. 29. Thus, a behavior control suitable for the collision type is necessary.

First, a control in the case of a side collision with the two-wheeler shown in FIG. 29A, which is the most frequent case of accident occurrence, will be explained. This side collision occurs most frequently. In the case of the side collision of the two-wheeler, a passenger is sandwiched between the two-wheeler and a vehicle and injured. Since the passenger is sandwiched, it is difficult to control the collision behavior of the passenger. Thus, to control the collision behavior of the passenger, it is necessary to prevent the passenger from being sandwiched. Front and rear wheels of the two-wheeler are come into contact with a road surface and the passenger keeps balance, and thus, the two-wheeler can travel. The moving direction can easily be changed by changing the balance state.

That is, as shown in FIG. 30, a contact portion between the wheel of the two-wheeler and a road surface is pushed by the two-wheeler collision behavior control element constituted by the air bag element disposed in a front portion of the vehicle, thereby changing the balance state and the moving direction of the two-wheeler can be changed to a direction of the vehicle. When the two-wheeler moves toward the vehicle, the two-wheeler turns around the contact portion between the wheel and the road surface, and therefore, the longitudinal movement of the two-wheeler is stopped. At that time, the stop positions of the two-wheeler and the passenger are different from each other as shown in FIG. 30.

Since the connection between the two-wheeler and the passenger is not strong, the passenger is separated from the two-wheeler when the two-wheeler stops. This separating state between the two-wheeler and the passenger is confirmed by the result of the experiment. In the result of the experiment, as explained above, the passenger may be sandwiched in some cases. Therefore, as shown in FIG. 30, after the passenger is separated from the two-wheeler, the air bag element of the passenger protection device 41 is developed like the collision behavior control for a pedestrian, and collision behavior of the two-wheeler passenger is controlled. Thereby, it is possible to independently control the collision behavior of the two-wheeler and the collision behavior of the passenger.

Figure 32:
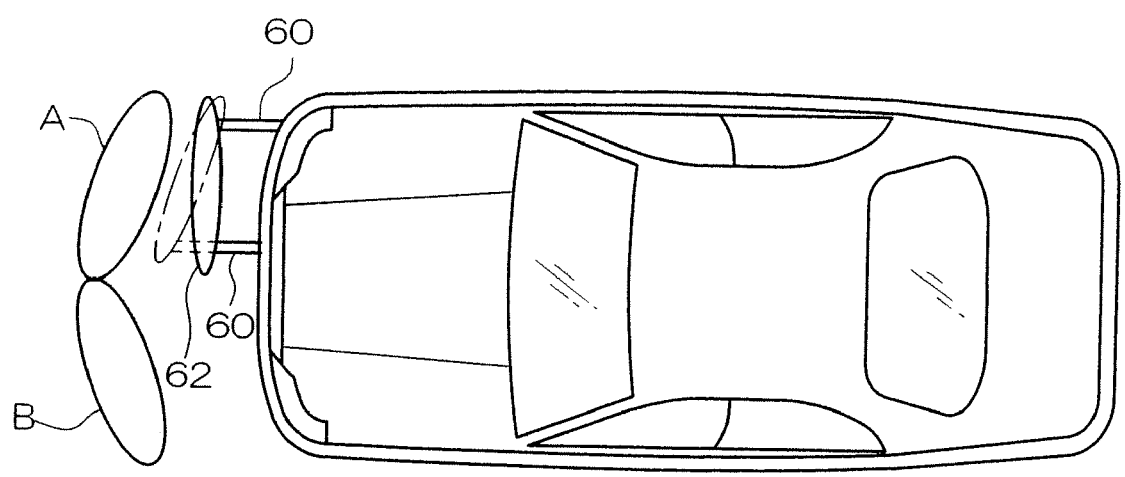
FIG. 32 is a schematic diagram showing a relative angle between a contacting part of the two-wheeler collision behavior control element and the two-wheeler.
Figure 34A:
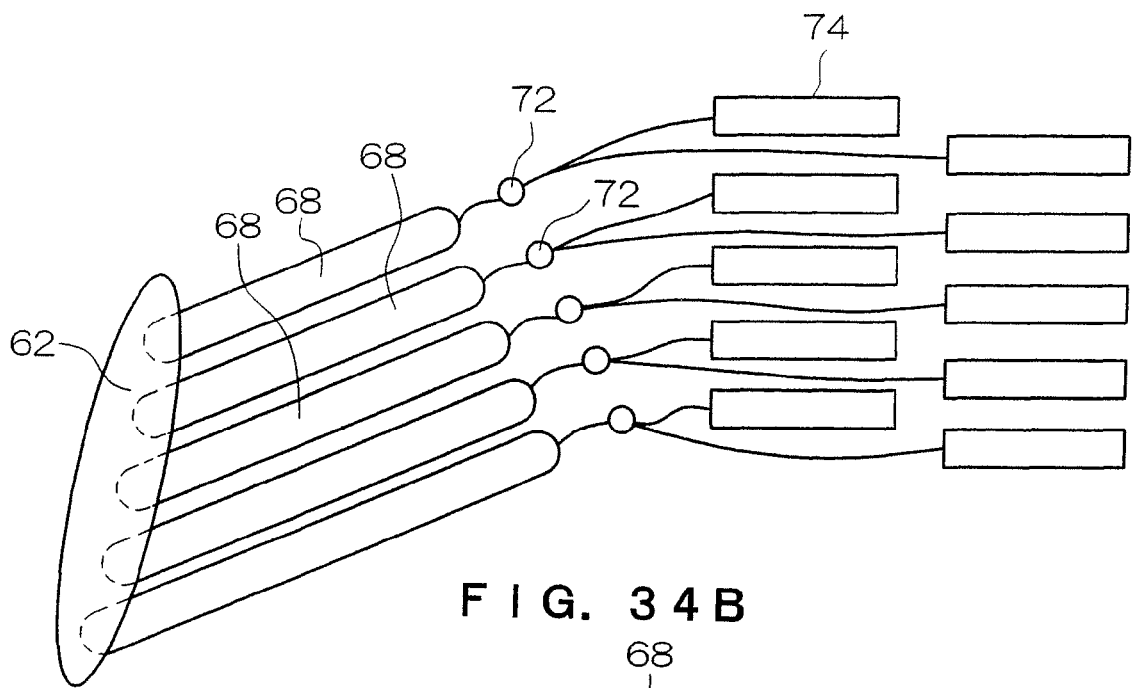
FIG. 34A are schematic diagrams showing another example of an air bag element constituting the two-wheeler collision behavior control element.
Figure 34B:
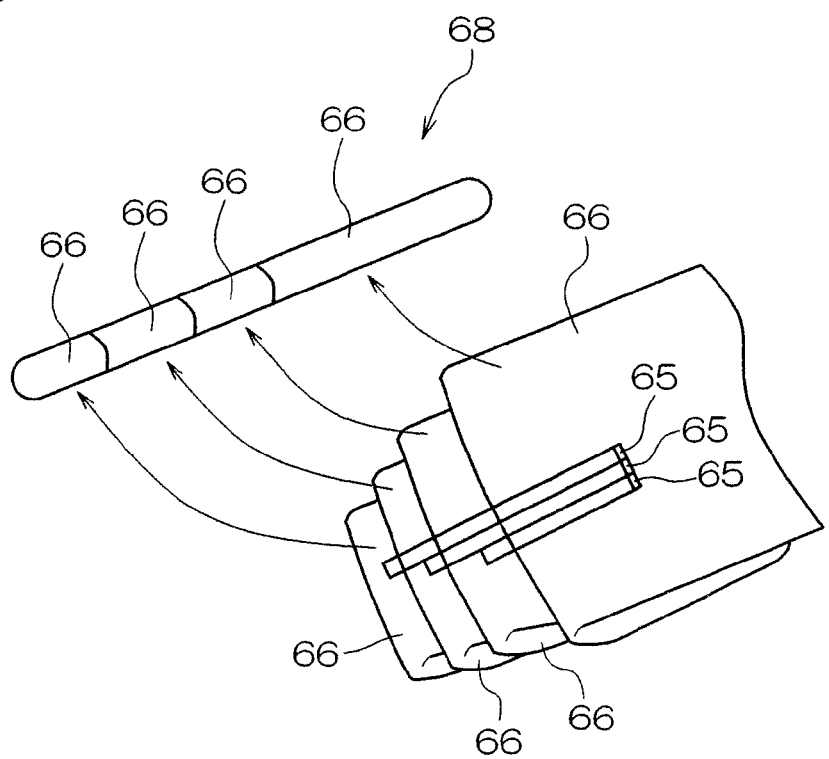
FIG. 34B are schematic diagrams showing another example of an air bag element constituting the two-wheeler collision behavior control element.

Next, the two-wheeler collision behavior control using the above-explained two-wheeler collision behavior control element will be explained. The collision type shown in FIG. 29A is a type in which a vehicle collides against a side of a two-wheeler. The two-wheeler and the vehicle are not always in the relative positional relationship shown in FIG. 29A according to a collision state, and they may be in a relative position A or relative position B having a different inclination angle between the vehicle and the two-wheeler as shown in FIG. 32.

In such a case, an expansion amount (pushing-out length) of each of pushing portions such as the expansion rods, and the like, which are disposed in adjacent to each other is changed, the inclination angle is changed, and therefore the collision behavior of the two-wheeler is controlled. Thereby, the contact portion of the two-wheeler is inclined in accordance with the relative positional relationship with respect to the two-wheeler and it can come into contact with the two-wheeler. Such control can be performed by determining a direction of wheels of the two-wheeler by the control device 24 from the relative positional relationship between the two-wheeler and the vehicle and from external environment detected by the external environment detection means, and by controlling the pushing-out length of each of the pushing portions in accordance with the direction of the wheels.

It is preferable that an angle between wheels of the two-wheeler and the contact portion of the two-wheeler is set to such an angle that a side surface of the wheel of the two-wheeler and a contact surface of the contact portion of the two-wheeler are approximately in parallel to each other when the vehicle collides against a side of the two-wheeler.

Since the balance state of the two-wheeler which comes into contact with the contact portion of the two-wheeler is changed as described above, the moving direction of the two-wheeler is changed into a direction of the vehicle, the two-wheeler and the two-wheeler passenger are inclined, and the two-wheeler and the passenger are separated from each other. The separated two-wheeler passenger approaches the vehicle with a low attitude due to inertia, the passenger is pushed by the contact portion of the air bag element of the two-wheeler passenger protection device 41 and is moved sideway of the vehicle without being bounced onto the hood of the vehicle. Thereby, damage of the two-wheeler passenger at the time of collision is reduced.

The above-explained two-wheeler behavior control element can also be used as a pedestrian behavior controller which controls behavior of a pedestrian.

Next, two-wheeler collision behavior control for collision types other than that shown in FIG. 29A will be explained. The same idea concerning the two-wheeler collision behavior control as described above can be applied to the collision types other than that shown in FIG. 29A, the contact portion of the two-wheeler collision behavior control element is moved from its initially disposed state and brought into contact with a wheel of the two-wheeler, and the collision behavior of the two-wheeler is controlled.

In a collision type in which the two-wheeler collides against a side of a vehicle shown in FIG. 29B, like the case shown in FIG. 29A, it is necessary to change the relative position between the vehicle and the two-wheeler so as to separate the two-wheeler and the two-wheeler passenger from each other such that a side of the two-wheeler can be seen from the vehicle. In order to establish a relative positional relationship such that the side of the two-wheeler can be seen from the vehicle as the referential relative positional relationship shown in FIG. 29B, it is necessary to align a moving direction axis of the two-wheeler and a moving direction axis of the vehicle with each other. That is, when the two-wheeler is to collide against the side of the vehicle, the moving direction axis of the two-wheeler and the moving direction axis of the vehicle are approximately intersecting with each other orthogonally. Thus, the two-wheeler is pushed such that an angle created between the moving direction axis of the two-wheeler and the moving direction axis of the vehicle becomes an obtuse angle just before the two-wheeler collides against the side of the vehicle, and the two-wheeler is moved in such a direction that the moving direction axis of the two-wheeler and the moving direction axis of the vehicle are aligned with each other.

In the collision type shown in FIG. 29B, as shown in FIG. 33A, the contact portion of the two-wheeler collision behavior control element is inclined with respect to the two-wheeler and pushed out such that a normal direction of a contact portion 62 is oriented to left and forward direction with respect to the traveling direction of the vehicle. The two-wheeler comes into contact with the contact portion which is inclined and pushed out, the two-wheeler is controlled such that it moves into the traveling direction of the vehicle, the moving direction of the two-wheeler is changed as shown in FIG. 33B, and a side of the two-wheeler can be seen from a driver in the vehicle.

In order to incline the contact portion with respect to the two-wheeler and bring the contact portion into contact with the two-wheeler, an air bag element having a triangle developing shape as shown in FIG. 33A is used. An air bag element having U-shaped developing shape is used or pushing amounts of adjacent pushing portions are made different from each other by the control, and therefore, the contact portion is brought into contact with the two-wheeler in the inclined state with respect to the two-wheeler. This control is similar to the control in FIG. 32 of a case in which the relative positional relationship between the two-wheeler and the contact portion is inclined in the collision type in FIG. 29A.

Since the balance of the two-wheeler which comes into contact with the contact portion is changed as described above, the moving direction of the two-wheeler is changed sideway, the two-wheeler and the two-wheeler passenger are inclined, and the two-wheeler and the passenger are separated from each other as shown in FIG. 33C. The separated two-wheeler passenger approaches the vehicle by inertia, the passenger is held by the two-wheeler passenger protection device 43 in a state in which the collision energy of the passenger is absorbed by the two-wheeler passenger protection device 43, and the collision is alleviated. Thereby, the damage of the two-wheeler passenger at the time of collision is reduced.

According to the example, it is possible to control the pushing-out angle of the two-wheeler collision behavior control element so as to be any angle, and even in various collision types of the two-wheeler, the collision behavior of the two-wheeler can be controlled, the two-wheeler and the passenger can be separated from each other and damage of the passenger of the two-wheeler can be reduced.

To obtain the triangular or U-shaped developing shape by the air bag element, it is possible to use an air bag element using a plurality of small air bag bodies in addition to the two-wheeler pushing device 64 sown in FIG. 31B and FIG. 31C.

The air bag element is provided with a pushing-out portion comprising a plurality of expansion air bag bodies 68 arranged in parallel. The expansion air bag bodies 68 are configured by a plurality (e.g., four as illustrated in the drawing) of small air bag bodies 66 which are connected to one another via pressure division walls 65, which are released by different pressures, interposed therebetween. The small air bag bodies 66 are developed into a rod-like shape.

The contact portion 62 comprising the small air bag bodies is connected so as to straddle the tip ends of the plurality of expansion air bag bodies 68 constituting the pushing-out portion. The expansion air bag bodies are connected to the plurality of inflators 74 connected to the control device 24 through a control valve 72 and a pipe connected to the control device 24.

The plurality of inflators is connected to the expansion air bag bodies. Therefore, if the control valve is switched over by the control device to operate the inflators and a supply amount of gas generated by the inflator to each of the expansion air bag bodies is controlled, the pressure division wall is opened in accordance with the supplied pressure and the number of small air bag bodies to be developed can be controlled, and the contact portion can be pushed out in its inclined state.

As the pressure control method, there are a method for controlling the number of inflators to be connected to the above-explained air bag element, and a method for controlling an opening degree of the control valve provided in the pipe line.

The contact portion connected to the end of the pushing-out portion can be made of cloth, resin plate or metal thin plate in addition to the above-explained air bag element.

The pushing-out timing of the contact portion is controlled by the moving speed of the driver's vehicle, and sizes of a two-wheeler and two-wheeler passenger measured by the sensor, and the like.

The pushing-out timing of the contact portion may be varied depending upon the front portion shape, and the like, of the vehicle. For example, in a sedan vehicle and a cab-over vehicle, a two-wheeler passenger comes into contact with a vehicle in the case of the cab-over vehicle at earlier timing than that of the sedan vehicle in many cases and thus, the pushing-out operation of the contact portion may be carried out at early timing.

Next, the two-wheeler collision behavior control of the collision types in FIG. 29C and FIG. 29D will be explained. Concerning the two-wheeler collision behavior control in these collision types, the basic idea of the control is the same as that of the above-described collision type. That is, contact portion between the wheel of the two-wheeler and a road surface is pushed by the air bag element or the like, and the moving direction of the two-wheeler is controlled.

The collision behavior control of a two-wheeler and a passenger in a head-on collision of the two-wheeler in FIG. 29C will be explained. In this case, the same air bag element as that of FIG. 31A, which develops rearward of the vehicle, is disposed in a rear bumper of the vehicle. An approach of the two-wheeler is detected by a sensor disposed on a rear portion of the vehicle, and when it is determined whether it is difficult to avoid collision based on relative speed difference between the two-wheeler and the vehicle obtained by the sensor, the air bag element for controlling the two-wheeler collision behavior is developed from the rear portion of the vehicle, thereby pushing out the contact portion as explained above. The air bag element is developed from near the bumper to the rearward of the vehicle, the developing shape of the air bag element is almost triangular or U-shaped as shown in FIG. 33, a front wheel of the two-wheeler comes into contact with the contact portion of the air bag element, the front wheel moves along the contact portion of the air bag element, and the moving direction of the two-wheeler is changed to the left side, i.e., to a road shoulder, with respect to the traveling direction of the vehicle. In the case of "keep to the left traffic", the moving direction of the two-wheeler is changed into right and the two-wheeler may be changed to a road shoulder side.

Since the connection between the two-wheeler and the passenger is not strong, the passenger moved in the same direction as the moving direction before collision by inertia, i.e., moves rearward of the vehicle. The two-wheeler and the two-wheeler passenger are separated from each other by the series of action. The two-wheeler passenger after separation comes into contact with the air bag element for the passenger collision behavior control which develops rearward of the vehicle. The air bag element for the passenger collision behavior control absorbs action energy of the passenger and changes the moving direction into right. This is because the two-wheeler and the passenger do not again come into contact with each other after separation. Thereby, the impact force at the time of collision is reduced as compared with a case in which the two-wheeler collision behavior control element is not provided, and therefore damage of the two-wheeler passenger at the time of collision is reduced.

Concerning the collision type of rear collision of a two-wheeler in which a vehicle collides against a rear portion of a two-wheeler of FIG. 29D, the basic idea of the collision behavior control of is the same as that of the head-on collision. That is, the air bag element is developed forward of the vehicle as shown in FIG. 30, and the collision behavior of the two-wheeler is controlled. The developing shape of the air bag element is almost triangular or U-shape like the developing shape of the air bag element at the time of head-on collision of the two-wheeler shown in FIG. 29C.

The side surface of the air bag element pushes a rear wheel of the two-wheeler, thereby changing the moving direction of the two-wheeler into left or right, and the two-wheeler is moved toward a road shoulder. The two-wheeler whose moving direction is changed and the two-wheeler passenger who maintains the moving direction before collision by inertia are separated from each other, and the passenger comes into contact with a front portion of the vehicle. The air bag element for the passenger collision behavior control is developed forward of the vehicle, the air bag element absorbs the action energy of the passenger and changes the moving direction of the passenger. The moving direction of the passenger is set so as to be different from the moving direction of the two-wheeler and the vehicle such that the separated passenger does not again comes into contact with the two-wheeler or the vehicle like the case of front collision.

By the above-described series of collision behavior control, it is possible to prevent a passenger after rear collision of the two-wheeler from being bounced and sandwiched, and damage of the passenger at the time of collision is reduced.

INDUSTRIAL APPLICABILITY

If the invention is applied to a vehicle, it is possible to control action of the vehicle such that an obstruction is detected and the detected obstruction is avoided, and when it is difficult to avoid the detected obstruction, the action of the vehicle is controlled such that damage is minimized, and the invention can be applied to a purpose for protecting a pedestrian and a two-wheeler passenger.

EXPLANATION OF SYMBOLS

10 vehicle speed sensor
12 yaw rate sensor
14 steering angle sensor
16 throttle opening degree sensor
18 camera
20 laser radar
24 control device
26 action prediction database
28 active front and rear wheel steering angle control device
30 hydraulic brake pressure circuit
32 throttle opening degree control device
34 map database
40 pedestrian protection device

What is claimed is:

1. A vehicle motion control device comprising:
    an external environment detection unit for detecting an external environment;
    a travel state detection unit for detecting a travel state of a driver's vehicle;
    an environment map creation unit for detecting an obstruction based on the external environment detected by the external environment detection unit and for creating an environment map indicating the obstruction;

an avoidance action estimation unit for estimating a plurality of possible avoidance actions for avoiding the obstruction based on the environment map and the travel state of the driver's vehicle detected by the travel state detection unit; and a selection unit for estimating collision damage according to each avoidance action estimated by the avoidance action estimation unit and for selecting an appropriate avoidance action based on the estimated collision damages.

2. The vehicle motion control device of claim 1, wherein when an avoidance action exists according to which the collision damage is less than a predetermined value, the selection unit selects the avoidance action according to which the collision damage is less than the predetermined value as the appropriate avoidance action, and when there is no avoidance action according to which the collision damage is less than the predetermined value, the selection unit selects an avoidance action having the minimum collision damage equal to or higher than the predetermined value as the appropriate avoidance action.

3. The vehicle motion control device of claim 1, wherein when a possibility of a new obstruction appearing from a dead angle region in the environment map is low, and when a possibility of a new obstruction appearing from the dead angle region in the environment map and interfering with the avoidance action estimated by the avoidance action estimation unit is low, the selection unit selects the appropriate avoidance action based on the estimated collision damages, and when the possibility of the new obstruction appearing from the dead angle region in the environment map and interfering with the avoidance action estimated by the avoidance action estimation unit is high, the selection unit selects, as an optimum avoidance action, straight braking avoidance action of traveling at maximum deceleration in parallel to a road on which the driver's vehicle is traveling, or an avoidance action to be carried out by the driver.

4. The vehicle motion control device of claim 1, wherein the avoidance action estimation unit comprises:

an action prediction database in which data, including data indicative of a probability of presence of an obstruction, for predicting behavior of an obstruction is stored;

a risk map creation unit for creating a risk map for predicting a current risk based on the environment map;

a future risk map creation unit for creating a future risk map to predict a risk after a predetermined time based on the current risk map created by the risk map creation unit, and the action prediction database;

a passage time risk map creation unit for creating a passage time risk map to predict a risk at a passage time, based on a passage time at which the driver's vehicle passes through a shortest trajectory when a shortest avoidance control for moving to a lateral position on the road is executed, having the lateral position on the road as a parameter, and the future risk map; and a risk minimization avoidance action estimation unit for estimating, as the avoidance action, an action for moving to the lateral position on the road that minimizes the risk on the shortest trajectory, based on the passage time risk map.

5. The vehicle motion control device of claim 1, further comprising a control unit for controlling the driver's vehicle such that the avoidance action selected by the selection unit is carried out.

6. A vehicle motion control device comprising:

an external environment detection unit for detecting an external environment;

a risk map creation unit for detecting a position and a type of an obstruction based on the external environment detected by the external environment detection unit and for creating a risk map to predict a current degree of risk based on the position and the type of the obstruction;

an action prediction database in which data, including data indicating a probability of presence of an obstruction, for predicting behavior of an obstruction is stored;

a future risk map creation unit for creating a future risk map to predict a degree of risk after a predetermined time based on the current risk map created by the risk map creation unit, and the action prediction database;

a passage time risk prediction unit for creating a passage time risk map to predict a risk at a passage time, based on a passage time at which the driver's vehicle passes through a shortest trajectory when a shortest avoidance control for moving to a lateral position on the road is executed, having the lateral position on the road as a parameter, and the future risk map; and a control unit for determining, as the avoidance action, an action for moving to a lateral position on a road that minimizes the risk on the shortest trajectory, based on the passage time risk map and for controlling the driver's vehicle such that the determined avoidance action is carried out.

7. The vehicle motion control device of claim 6, wherein when a possibility of a new obstruction appearing from a dead angle region of the passage time risk map is low, and when a possibility of a new obstruction appearing from the dead angle region in the passage time risk map and interfering with the determined avoidance action is low, the control unit controls the driver's vehicle such that the determined avoidance action is carried out, and when the possibility of the new obstruction appearing from the dead angle region in the passage time risk map and interfering with the determined avoidance action is high, the control unit controls the driver's vehicle such that a straight braking avoidance action of traveling at maximum deceleration in parallel to a road on which the driver's vehicle is traveling, or an avoidance action to be carried out by the driver, is carried out.

8. The vehicle motion control device of claim 4, wherein when the obstruction is a pedestrian, at least one of age and direction of line of sight is checked, and the probability of presence of the obstruction after a predetermined time is corrected based on a result of the check.

9. The vehicle motion control device of claim 6, wherein the shortest trajectory is obtained in accordance with a longitudinal speed of the driver's vehicle with respect to the road, a lateral speed of the driver's vehicle, a friction coefficient between a tire of the driver's vehicle and the road surface, and a distance between an intended lateral position and a lateral position of the driver's vehicle.

10. The vehicle motion control device of claim 4, wherein the risk is determined by a product of a standard degree of risk corresponding to the type of the obstruction and a correction coefficient determined based on at least one of the external environment or an accident occurrence ratio.

11. The vehicle motion control device of claim 5, wherein when the driver's vehicle stops, when the avoidance action cannot be estimated, or when the driver's vehicle is controlled such that the avoidance action is carried out and collision damage is generated, the control unit controls a yaw angle of a vehicle such that a vehicle position which minimizes the collision damage is obtained based on the passage time risk map.

12. A vehicle motion control device comprising:
an external environment detection unit for detecting an external environment;
a risk map creation unit for detecting a position and a type of an obstruction based on the external environment detected by the external environment detection unit and for creating a risk map to predict a current risk based on the position and the type of the obstruction,
an action prediction database in which data, including data indicating a probability of presence of an obstruction, for estimating an action of an obstruction is stored,
a future risk map creation unit for creating a future risk map to predict a risk after a predetermined time based on the current risk map created by the risk map creation unit and the action prediction database,
a passage time risk map creation unit for creating a passage time risk map to predict a risk at a passage time, based on a passage time at which the driver's vehicle passes through a shortest trajectory when a shortest avoidance control for moving to a lateral position on the road is executed, having the lateral position on the road as a parameter, and the future risk map; and
a control unit for controlling a shift down such that a number of revolutions of an engine of the driver's vehicle is increased when a future risk is equal to or higher than a predetermined value based on the passage time risk map at the time when a pedestrian as an obstruction passes.

13. The vehicle motion control device of claim 1, wherein the external environment detection unit detects an obstruction by obtaining information indicating a position and a speed of the obstruction.

14. The vehicle motion control device of claim 1, wherein a damage level indicating the collision damage of each of the avoidance actions is estimated by a product of a magnitude of damage, a probability and a correction value, and when there is a possibility that a latent obstruction exists, the damage level is calculated using the probability of presence of the latent obstruction as the probability, and an optimum avoidance action is selected based on the calculated damage level.

15. The vehicle motion control device of claim 6, wherein when the obstruction is a pedestrian, at least one of age and direction of line of sight is checked, and the probability of presence of the obstruction after a predetermined time is corrected based on a result of the check.

16. The vehicle motion control device of claim 6, wherein the risk is determined by a product of a standard degree of risk corresponding to the type of the obstruction and a correction coefficient determined based on at least one of the external environment or an accident occurrence ratio.

17. The vehicle motion control device of claim 6, wherein when the driver's vehicle stops, when the avoidance action cannot be estimated, or when the driver's vehicle is controlled such that the avoidance action is carried out and collision damage is generated, the control unit controls a yaw angle of a vehicle such that a vehicle position which minimizes the collision damage is obtained based on the passage time risk map.

18. The vehicle motion control device of claim 6, wherein the external environment detection unit detects an obstruction by obtaining information indicating a position and a speed of the obstruction.

19. The vehicle motion control device of claim 12, wherein the external environment detection unit detects an obstruction by obtaining information indicating a position and a speed of the obstruction.

* * * * *